(12) United States Patent
Seaman et al.

(10) Patent No.: US 7,519,550 B2
(45) Date of Patent: Apr. 14, 2009

(54) STORAGE MEDIUM FOR FACILITATING PARTS PROCUREMENT AND PRODUCTION PLANNING ACROSS AN EXTENDED SUPPLY CHAIN

(75) Inventors: E. Weston Seaman, Poughkeepsie, NY (US); Laurie Cohn, Poughkeepsie, NY (US); James Greene, Wappingers Falls, NY (US); Eric Lambert, Wappingers Falls, NY (US); Benjamin J. Steele, Newburgh, NY (US); Debra J. White, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 12/022,271

(22) Filed: Jan. 30, 2008

(65) Prior Publication Data

US 2008/0120198 A1    May 22, 2008

Related U.S. Application Data

(63) Continuation of application No. 09/757,070, filed on Jan. 8, 2001, now Pat. No. 7,359,874.

(51) Int. Cl.
*G06F 17/50* (2006.01)
*G06F 17/30* (2006.01)
*G06Q 10/00* (2006.01)
*G06Q 30/00* (2006.01)

(52) U.S. Cl. .............................. 705/29; 705/28; 705/10; 705/26

(58) Field of Classification Search .................. 705/29, 705/28, 26, 10
See application file for complete search history.

(56) References Cited

U.S. PATENT DOCUMENTS

| | | | |
|---|---|---|---|
| 5,117,354 A | 5/1992 | Long et al. |
| 5,319,542 A | 6/1994 | King, Jr. et al. |
| 5,446,890 A | 8/1995 | Renslo et al. |
| 5,570,291 A | 10/1996 | Dudle et al. |

FOREIGN PATENT DOCUMENTS

JP    04247567 A    9/1992

(Continued)

OTHER PUBLICATIONS

Parts&Vendors, Trilogy Design, 1998. Downloaded on May 3, 2008 from http://web.archive.org/web/19980703072236/www.trilogydesign.com/main.htm.*

(Continued)

*Primary Examiner*—F. Zeender
*Assistant Examiner*—Paul Danneman
(74) *Attorney, Agent, or Firm*—Cantor Colburn LLP; Daniel Schmurmann

(57) ABSTRACT

A storage medium for managing a supply chain is provided. The storage medium includes instructions for implementing a method. The method includes transmitting a bid request from a bill of material (BOM) file to a web site and receiving a response from a supplier, resulting in an award notice. The method also includes identifying component prices incurred by the supplier that manufactures products using the components, comparing the prices with those available to the manufacturer from a component supplier. For components in which the supplier incurs a price greater than that available to the manufacturer, the method includes requesting authorization for the supplier to purchase a quantity of the component from the component supplier at the purchase price available to the manufacturer. Upon approval, the method includes transmitting an authorization to the supplier to purchase the component directly from the component supplier. The authorization includes guidelines for the contract manufacturer to follow.

21 Claims, 19 Drawing Sheets

U.S. PATENT DOCUMENTS

| | | | |
|---|---|---|---|
| 5,710,887 | A | 1/1998 | Chelliah et al. |
| 5,712,985 | A | 1/1998 | Lee et al. |
| 5,712,989 | A | 1/1998 | Johnson et al. |
| 5,758,327 | A | 5/1998 | Gardner et al. |
| 5,842,178 | A | 11/1998 | Giovannoli |
| 5,923,552 | A | 7/1999 | Brown et al. |
| 5,974,395 | A | 10/1999 | Bellini et al. |
| 5,978,811 | A | 11/1999 | Smiley |
| 6,035,289 | A | 3/2000 | Chou et al. |
| 6,055,519 | A | 4/2000 | Kennedy et al. |
| 6,115,690 | A | 9/2000 | Wong |
| 6,167,378 | A | 12/2000 | Webber, Jr. |
| 6,167,385 | A | 12/2000 | Hartley-Urquhart |
| 6,199,050 | B1 | 3/2001 | Alaia et al. |
| 6,230,146 | B1 | 5/2001 | Alaia et al. |
| 6,249,772 | B1 | 6/2001 | Walker et al. |
| 6,343,275 | B1 | 1/2002 | Wong |
| 6,594,799 | B1 | 7/2003 | Robertson et al. |
| 6,606,744 | B1 | 8/2003 | Mikurak |
| 6,625,616 | B1 * | 9/2003 | Dragon et al. ........... 707/104.1 |
| 6,947,903 | B1 * | 9/2005 | Perry ........................ 705/28 |
| 7,440,911 | B1 * | 10/2008 | Fors et al. .................. 705/26 |
| 2002/0007324 | A1 | 1/2002 | Centner et al. |
| 2002/0143692 | A1 | 10/2002 | Heimermann et al. |

FOREIGN PATENT DOCUMENTS

| | | | |
|---|---|---|---|
| JP | 06096089 | A | 4/1994 |
| JP | 06119309 | A | 4/1994 |
| JP | 11110451 | A | 4/1999 |
| JP | 2002074045 | A | 3/2002 |
| WO | 9728506 | A1 | 7/1997 |
| WO | 0023929 | A1 | 4/2000 |
| WO | 0058898 | A2 | 10/2000 |

OTHER PUBLICATIONS

Stephans, James et al, "Cross-Functional Interface of Marketing and Accounting" Mid-American Journal of Business, vol. 13, No. 1, Spring 1998, 14p.

Harbert, Tam, "Searching for.Com-ponents" Electronic Business, Aug. 1, 1999, 7p.

Alaniz, Scott et al., "E-Procurement A Guide to Buy-Side Applications", Stephens, Inc. Industry Report, Dec. 27, 1999, 55p.

Spera, Jason, "Managing Front-End Data More Effectively", EP&P, Aegis Industry Publication Series, Feb. 2000, 4p.

Brunelli, Mark, "E-Auctions Online Auctions Save Millions for Quaker Oats and SmithKline Beecham", Purchasing Magazine, Mar. 23, 2000, 3p.

Carbone, James, "E-Procurement at IBM:POs are just the beginning" Purchasing Magazine, Mar. 23, 2000, 4p.

Carbone, James, "What Buyers Look For in Contract Manufactueres" Purchasing Magazine, Mar. 23, 2000, 4p.

Anonymous, "Purchasing Hotline" Purchasing: Mar. 23, 2000, 129, 1; 6p.

Purchasing, [online]; [Retrieved on Nov. 29, 2007]; retrieved from the internet http://www.purchasing.com/index. asp?layout=articlePrint&articleID=CA147092&article Staff "A Sampling of Web Sites That Feature Auctions or Reverse Auctions" Purchasing Mar. 23, 2000, 2p.

PolyDyne Software, [online]; [Retrieved on Nov. 29, 2007]; retrieved from the internet http://www.polydyne.com/newsroom/ pr_000627a.html Press Release, "DesignWin Upgrade Tackles Key OEM Supply Chain Management Issues" PolyDyne Jun. 27, 2000.

"Supply Works' Hosted Solution Offers Web-Based Platform for the Strategic Management of Production Procurement" Aberdeen Group, Jun. 2000, 10p.

"Purchasing Hotline, Late-Breaking News and Analysis for Purchasing/Supply Chain Management Professionals" Purchasing Magazine, Jul. 13, 2000, 7p.

Anonymous "Purchasing Plans e-biz Online Supply Registry", Purchasing Magazine, Jul. 13, 2000, 27p.

FreeMarkets "United Technologies Corporation Case Study", and brochures from www.freemarkets.com, 12 p. 2003.

Srinivasan, Mandyam et al., "E-Business in The Supply Chain", 10p.

* cited by examiner

OEM

Phone:
Fax:

11/10/2000

Attention: Mr/s

Subject: Supplier Third Party Purchase Authorization

Dear Mr.

OEM requests written authorization for "Subcontractor" to purchase the OEM part numbers ("Products " or "Services") listed on the attached Schedule at the prevailing OEM contract price and pursuant to the existing_____(enter relevant contract number) between you and OEM. Pursuant to this authorization, you will honor Work Authorizations (typically in the form of a purchase order) issued by Subcontractor for Products or Services, provided such Work Authorizations reference the OEM part number and are issued in the performance of contracted work for OEM.

This authorization does not create an agency relationship between us, and you will remain an independent contractor. In no event will OEM assume responsibility for transactions conducted between you and Subcontractor. OEM reserves the right to rescind this authorization in any part and at any time.

Please fill in detail below and return this authorization letter via e-mail within five business days of your receipt. Upon return receipt by OEM, we will send Subcontractor details regarding current pricing and estimated volumes for the Products or Services referenced on the attached Schedule.

If you have any questions, please contact_____ at phone ( __ ) ___-_____

Yours truly,

FIG. 5

OEM

Phone:
Fax:

03/10/2000

Authorized Third Party:

Re: Third Party Purchase Authorization

Attention:

Dear,

Effective _____ (date), you are authorized to purchase from OEM's component suppliers (collectively the "Supplier") certain OEM part numbers ("Products" or "Services") at the prevailing OEM contact prices. The Products or Services current contract prices and the Supplier list will be supplied in the attachment below. OEM reserves the right to rescind this authorization in any part and at any time. You are retained and will remain an independent contract or and in no event will OEM assume responsibility for any transaction between you and Supplier.

Pricing information disclosed hereunder is confidential and you agree not to disclose the same for a period of two (2) years from the date of your last purchase of Products and Services. For reconciliation purposes, you authorize Supplier to release to OEM information regarding Work Authorizations (e.g. Purchase Orders) ("WAs") issued by you for Products or Services.

All WAs issued by you to Supplier for Products and Services must be ordered by the OEM part number, and by doing so, you agree that such Products and Services will be used solely in the performance of contracted work for the OEM Corporation.

If you have any questions, please contact _____(name) enter name at _____(phone number) enter phone number.

Yours truly,

FIG. 7

```
OEM Buyer Report
         OEM            PART                  CURR          SUB-CON  OEM   QTY/   PER
 CARD    CARD  PN       TYPE                  SUPP  PRICE   PRICE    PRICE CARD
 CM      SAVINGS VOL SAVINGS
-------------------------------------------------------------------------------
PRO286
  9.999999999999999E-04  U.S.I.: 70G6163 CAPACITOR     ABC  ELEC   .0042  .0037   2
  750000  8700           U.S.I.: 10H6142 CAPACITOR     XYZ  ERI    .0355  .0239   1  .0116
  750000  7500           U.S.I.: 6480401 TRANSISTOR    SEMICON      .016  .0135   4  .01
  750000  174000         U.S.I.: 14J3882 FUSES         USA  CO      .175  .117    4  .232
  750000  1754325        U.S.I.: 05K2303 CAPACITOR     XYZ  ERI     .15   .07203  30 2.3391
  750000  6750           U.S.I.: 10H6122 CAPACITOR     ABC  ELEC   .0052  .0037   6  .009
Total Savings per card = 2.6027 Est. Annual Program Savings = 1952025
```

FIG. 8

STORAGE MEDIUM FOR FACILITATING PARTS PROCUREMENT AND PRODUCTION PLANNING ACROSS AN EXTENDED SUPPLY CHAIN

CROSS-REFERENCE TO RELATED APPLICATIONS

This application is a continuation application of U.S. Ser. No. 09/757,070, filed on Jan. 8, 2001, the disclosure of which is incorporated by reference herein in its entirety.

BACKGROUND OF THE INVENTION

The present invention relates generally to supply chain management of outsourced goods. More particularly, the present invention relates to an enhanced method and storage medium for facilitating parts procurement and production planning processes among supply chain partners in a multi-enterprise environment.

Conventional planning systems such as Enterprise Resource Planning (ERP), Material Requirements Planning (MRP) and Advanced Planning and Scheduling (APS) are well known in many industries today as useful methods for planning enterprise operations. ERP systems provide a framework that integrates all facets of a business, including planning, manufacturing, supply chain management, sales and marketing.

Common ERP software vendors such as SAP™, Oracle™, Baan™, and Peoplesoft™ are enabling businesses to implement these systems using computers. Traditional Material Requirements Planning (MRP) and Manufacturing Resource Planning systems generate requirements for materials, parts, and subassemblies that are established on an organization's Bills of Material (BOMs) for the manufacture of existing products.

With the advent of the Internet and related technology, more complex planning systems have evolved that allow two or more disparate and/or geographically independent businesses to interact with one another via a combination of network-based hardware and software solutions. Based on common communication protocols and common standards for system interoperability, the Internet provides a ubiquitous message routing architecture that supports reliable inter-business connectivity around the world. Further, the Internet and related intranet and extranet technologies offer a relatively low cost of entry, making them practical for use by large and small businesses alike. To alleviate related web-based security issues, companies have created two separate networks: an intranet that connects the internal processes to the applications and data they need and an extranet that connects external processes to the applications and data they need. Firewalls or security devices are then incorporated in order to protect against unauthorized access to the internal network and to prevent unauthorized Internet access from the extranet.

Despite the advances in planning systems software and Internet technology, Supply Chain Management (SCM) has been for some time, the weak or missing link. SCM involves the administration of an organization's supply channels, distribution, and transportation resources, including product ordering, fulfillment and replenishment. Many software vendors are scrambling to fill the void so that existing barriers between trading partners can be removed and a more synchronized flow of information can be facilitated.

Effective supply chain management is particularly important to the electronics industry. In today's global economy, particularly with respect to computer technology, life cycles and prices related to electronics such as personal computers, PDAs, cellular telephones, etc., have dramatically declined over the last ten years. Further, the growth of e-commerce on the Internet creates additional pressures on this industry as traditional geographic barriers are broken down and new businesses/competitors are entering the market. In order to stay competitive, these market dynamics require electronics businesses to develop and introduce new products faster and cheaper than the competition. To meet this demand, new and enhanced business solutions are critical.

One way in which businesses are meeting these challenges is by outsourcing production of products to third parties. Outsourcing applies where the original manufacturer (called an Original Equipment Manufacturer, or OEM) buys assemblies in bulk from third-party contract manufacturers and then customizes them for a particular application. It then markets and sells the customized equipment under its own name. By outsourcing the manufacturing and assembly of these goods, established OEMs are able to focus on other business areas such as new product development and customer relationship management. Additionally, as product designs and components are becoming increasingly complex and frequently updated, a contract manufacturer with specialized skills may be better equipped to accommodate the changing technology. By outsourcing to meet peak demands, an OEM may be able to avoid having to build new facilities and/or hire new people.

In an effort to facilitate the outsourcing processes, OEMs and their manufacturers and suppliers are forming what are known as 'virtual corporations (or extended enterprises) whereby each entity within the network, or supply chain, specializes in a particular area and, together, operate as one organization or business with respect to the products being produced. In order for these separate entities to effectively operate as one, they must be able to synchronize and share information and fully integrate their existing business processes. Information shared, such as product descriptions, bills of materials (BOMs), approved manufacturers/suppliers lists, etc., must be complete, accurate and up-to-date. Additionally, architectures and applications based on open standards are required in order for complete collaboration in real time within and among the supply chain entities to occur. Few existing applications provide integrated supply chain management solutions and none of these provide complete, synchronized collaboration abilities.

For example, the bidding process between an OEM and its contract manufacturers and suppliers is riddled with inefficiencies. Oftentimes an OEM is able to procure parts components for its 'in-house' assemblies at a much cheaper price than its contract manufacturers are able to due to the large volumes of purchasing it engages in. A contract manufacturer who pays more than the OEM for the same component necessarily passes on this extra cost to the OEM once the assembly is completed. The OEM, in turn, must sell the finished product to its customers at a higher cost. If the contract manufacturer could obtain the benefit of the OEM's lower contract prices, it could produce lower cost assemblies for the OEM, providing the OEM with instant cost savings. A process is therefore desirable that can improve the existing parts procurement and production planning system and process between an OEM and its suppliers and contract manufacturers by facilitating the identification, communication, and execution of cost savings opportunities.

BRIEF SUMMARY OF THE INVENTION

The present invention addresses the above-described need by providing a storage medium for facilitating manufacturing and production processes across an extended supply chain.

The storage medium includes instructions for implementing a method. The method includes transmitting a bid request from a bill of material (BOM) file to a web site and receiving a response from a supplier, resulting in an award notice. The method also includes identifying component prices incurred by the supplier that manufactures products using the components, comparing the prices with those available to the manufacturer from a component supplier. For components in which the supplier incurs a price greater than that available to the manufacturer, the method includes requesting authorization for the supplier to purchase a quantity of the component from the component supplier at the purchase price available to the manufacturer. Upon approval, the method includes transmitting an authorization to the supplier to purchase the component directly from the component supplier. The authorization includes guidelines for the contract manufacturer to follow.

BRIEF DESCRIPTION OF THE DRAWINGS

The present invention is described below with reference to the following drawing figures of which:

FIG. 5 is an exemplary supplier authorization request letter generated by the A-source application;

FIG. 7 is an exemplary contract manufacturer authorization letter generated by the A-source application; and FIG. 8 is an exemplary buyer report generated by the A-source application.

DESCRIPTION OF THE PREFERRED EMBODIMENT

Figure 1:
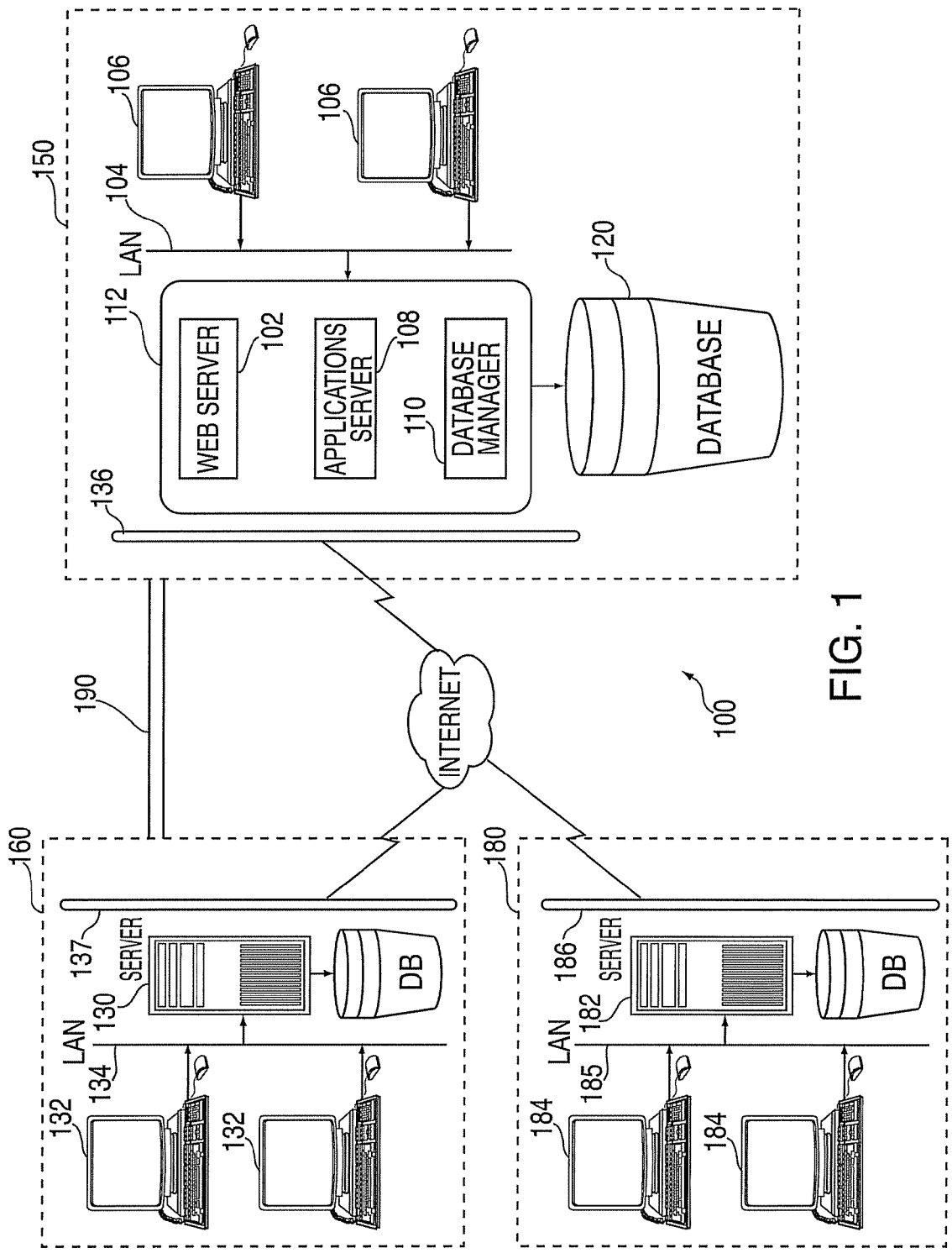
FIG. 1 is a block diagram of a portion of a network system on which the A-source application is executed in an exemplary embodiment of the present invention.

The A-source tool of the present invention automates supply chain processes which streamlines the manufacturing process. It involves automating and refining the requests for quote (RFQs) and requests for price updates processes between an OEM and its supply chain partners allowing the OEM to identify cost savings opportunities and make instant business decisions before and throughout its manufacturing cycle. The A-source tool enables an OEM to create a complete bill of materials, including part numbers, descriptions, a list of approved suppliers, quantities and attachments (such as technical drawings, terms and conditions). The information is then placed on the OEM's web site and potential suppliers who wish to work on the project are notified and can provide their responses to the OEM via the Internet, or alternatively, by an extranet connection. The A-source tool is used when the OEM purchases selected complete products from contract manufacturers who procure and assemble the components.

The application offers the OEM the ability to identify cost-savings opportunities by comparing its component costs from original manufacturers vs. a contract manufacturer's purchase price for the same component. The A-source tool is facilitated by a bridging component or application that allows disparate business data be integrated. An example of such a bridging tool is described in U.S. Pat. No. 7,047,215, which issued on May 16, 2006, and is incorporated herein by reference in its entirety. The bridging tool described in the above-referenced application allows OEMs to identify parts by 'business attributes' rather than solely by physical or configuration characteristics. Business attributes include key data such as whether a part is subject to consignment, whether a part is price masked, and whether a part is subject to a buy-off contract, and/or direct rebate program. Business attributes are employed by the OEM as part of its price protection techniques and are used to cut costs via the A-Source application. These terms are further defined as follows:

Direct Rebate: The OEM directs a contract manufacturer to buy strategic parts from an approved supplier that participates in the OEM's direct rebate process. The supplier sells directly to the contract manufacturer, then rebates the difference between the selling (market) price and the OEM contract price to the OEM.

OEM Consigned Parts: The OEM buys strategic parts directly from an approved supplier. The OEM then consigns these parts to a contract manufacturer.

Buying off an OEM contract: The contract manufacturer must have the approval of the respective commodity council and the component supplier prior to executing this technique. The contract manufacturer buys required parts directly from an approved OEM parts supplier at the OEM negotiated price.

Price Masked: 1) Outsourced supply chain team buys off production procurement council's negotiated contracts at the OEM price and sells to a contract manufacturer at an uplifted market price. 2) Outsourced supply chain team rebates the difference between the 'buy' price and the 'sell' price to the OEM division purchasing the assembly from the contract manufacturer. Parts are determined to be price masked if any one of the following criteria is met: a) OEM has a technology dependence/vested interest/influence; or b) OEM has a supply continuity leverage/advantage.

Applying business attributes to BOM items aids the OEM in its decision making processes. By automating the bidding process and keying critical BOM data with specified business attributes, the OEM is able to dramatically reduce production costs and make instant business decisions, thereby passing the savings on to customers.

The following illustrates the structural and operational aspects of the present invention:

In terms of structure, reference is now made to FIG. 1. Therein depicted is a block diagram representing a network system 100 for implementing the A-Source tool of the present invention. System 100 includes an OEM enterprise 150 comprising a web server 102 that is located on host system 112 and connected through a network 104 to terminals 106. The term "OEM" is used throughout this description to identify the organization implementing the A-Source application. Network 104 may comprise a LAN, a WAN or other network configuration known in the art. Further, network 104 may include wireless connections, radio based communications, telephony based communications, and other network-based communications. Applications server 108 and database manager 110 are also located on host system 112 and are in communication with web server 102 and network 104. Any web server software or similar program that handles general communications protocols and transport layer activities could be used as appropriate for the network protocol in use.

A firewall 136 or other security device limits access to manufacturing enterprise 150 to network users with proper authorization.

Host system 112 may include an IBM® S/390 system or other suitable computer system. Host system 112 is running web server software designed to accommodate various forms of communications, including voice, video, and text. For purposes of illustration, host system 112 is running Lotus Domino™ and Lotus Notes™ as its groupware applications software, however, any compatible e-mail-integrated, web-enabled collaborative software could be used. Applications server 108 executes the A-Source tool of the present invention. The A-Source application may be one of many business applications employed by manufacturing enterprise 150 which, in combination, constitute its Enterprise Resource Planning and Materials Requirements Planning suites described above.

Data storage device 120 is any form of mass storage device configured to read and write database type data maintained in a file store (e.g., a magnetic disk data storage device). Of course, it will be appreciated that data storage device 120 may be one that consists of multiple disk sub-systems which may be geographically dispersed and coupled via network architecture. There is no positive requirement that data storage device 120 be maintained in one facility; to the contrary, the volume of information stored therein may dictate geographical dispersion and the like. All that is required is that data storage device 120 be logically addressable as a consolidated data source across a distributed environment such as a network system. The implementation of local and wide-area database management systems to achieve the functionality of data storage device 120 will be readily understood by those skilled in the art. Information stored in data storage device 120 is retrieved and manipulated by database manager 110. For purposes of illustration, database manager 110 is utilizing IBM's DB/2® software.

Data storage device 120 provides a repository for a library of documents created and utilized by the A-Source tool. Also stored in data storage device 120 is a catalog or collection of tables used by a bridging component in conjunction with the A-Source tool in order to integrate various types of data received from different sources as will be explained further herein. Documents stored in data storage device 120 include lists of approved suppliers/manufacturers, A-Source activity log reports and miscellaneous reports, as well as general supplier and product information. The A-Source activity log is described further herein.

Supplier enterprise 160 comprises web server 130 that connects terminals 132 to intranet 134 and to the Internet. Firewall 137 provides security and protection against unauthorized access to internal network information from outside sources as well as controlling the scope of access to manufacturing enterprise system's 150 data. Terminals 132 may access web server 130 via internal web browsers located on terminals 132 (not shown). Supplier enterprise 160 may be an existing or prospective supplier of OEM enterprise 150.

Contract manufacturer enterprise 180 comprises a web server 182 that connects terminals 184 to intranet 185 and to the Internet. Firewall 186 limits and controls access to contract manufacturer enterprise 180. Terminals 184 access web server 182 via web browsers (not shown). Contract manufacturer enterprise 180 may be an existing or prospective contract manufacturer of OEM enterprise 150 which builds or assemblies products for the OEM under an outsourcing agreement. Although not shown in FIG. 1, system 100 may include a plurality of suppliers and contract manufacturers in communication via the Internet or related networking technologies.

The A-Source tool of the present invention is an e-business application that allows manufacturing enterprise 150 to submit requests for quote (RFQs) and requests for price updates to a contract manufacturer at enterprise 180 and/or a supplier at supplier enterprise 160 and have them respond over the Internet. The application analyzes the inputs to identify cost savings opportunities, thereby improving volume purchasing leverage, increasing productivity, and reducing time to market as a result of electronic data exchange.

Figure 2A:
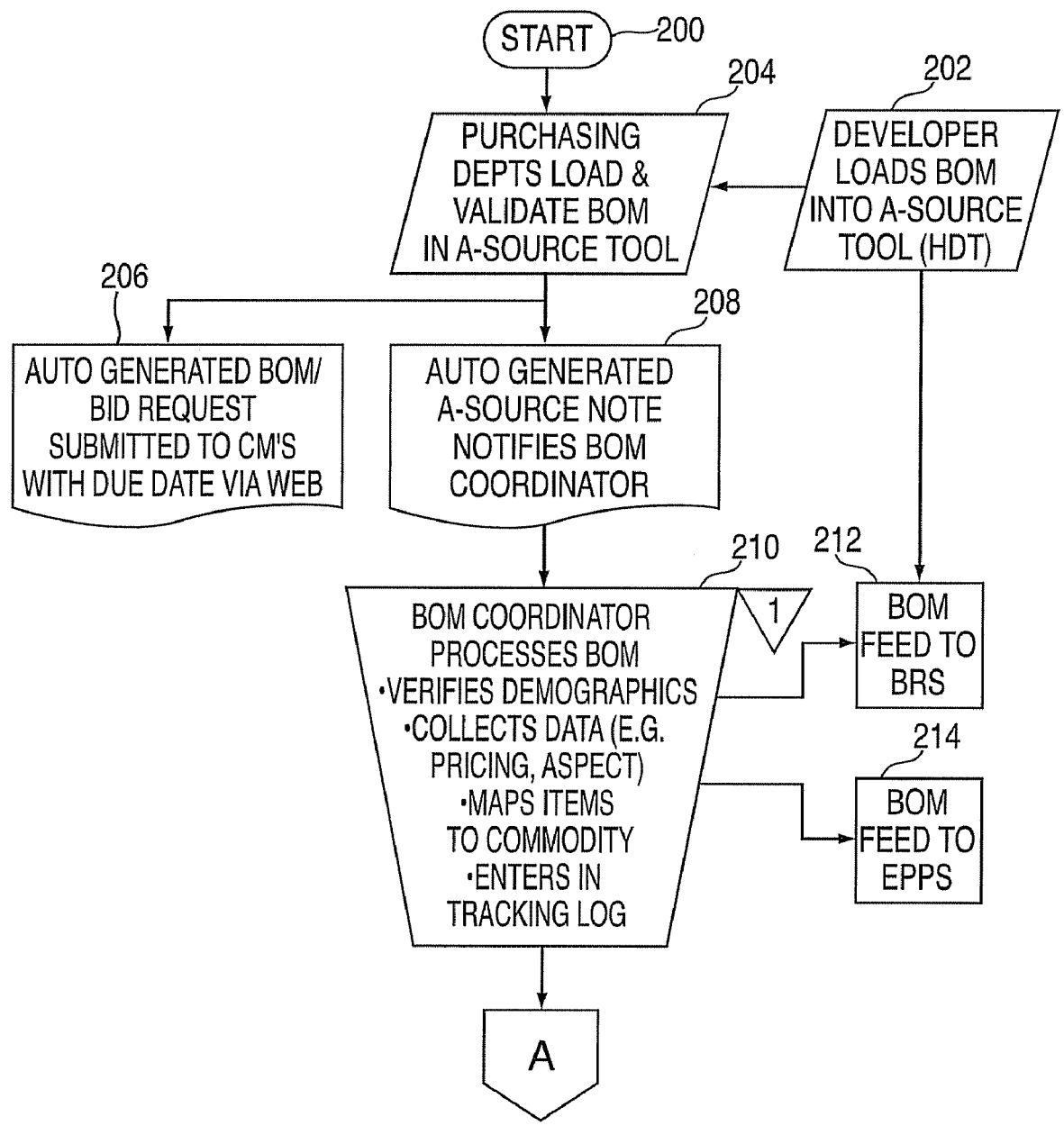
FIGS. 2A-2G represent a flowchart of the A-source bidding process.

The A-Source RFQ/bidding process is initiated at step 200 of FIG. 2A. The developer at manufacturing enterprise 150 loads a BOM file into the A-Source tool via a hardware development tool (HDT) at step 202 which, in turn, is fed to a bill of material review group (BRS) at step 212. A BOM file is a list of parts or components required for the assembly of a specified product and includes descriptive information pertaining to the parts, as well as quantities and pricing information. Alternatively, one or more specified purchasing departments within manufacturing enterprise 150 may load and validate a BOM file into the A-Source tool at step 204. The A-Source application automatically generates a BOM bid request for the BOM file and submits it to supplier enterprise 160 via web server 102 along with a due date for response at step 206. At the same time, the A-Source tool notifies a BOM coordinator of manufacturing enterprise 150 of the bid request and sends a duplicate of the BOM file at step 208. The BOM coordinator acts as a liaison between the various divisions or departments within manufacturing enterprise 150 which are involved with a particular BOM file. Once notified, the BOM coordinator processes the BOM file at step 210. This process includes verifying demographic information, collecting data pertaining to pricing and items listed in external data warehouse files, and mapping these items to a commodity. The date in which the BOM coordinator receives this notice is automatically recorded in an activity log provided by the A-Source application and is represented in FIG. 2A as Flag 1. The A-Source activity log is a means to track the progress of each BOM file as it is transmitted and processed through the system. Data recorded in the A-Source activity log is stored in data storage device 120.

Once the BOM file is processed, the results are fed to a bill of material review group at step 212 and to the enterprise production and planning system (EPPS) at step 214. Enterprise production and planning system (EPPS) is a component of the central planning system of FIG. 5 and is used as a front end engine that operates on the processed BOM file consolidating and associating the data contained therein with related data from other sources. The BOM coordinator then sends notification by Lotus Notes™ to a cost analysis review team indicating that the BOM file has been processed and identifies a quote due date at step 216 of FIG. 2B. The A-Source activity log records the date that this notice is sent at Flag 2. Coinciding with this notification to the cost analysis review team is a separate cost analysis pertaining to microelectronics components by a purchasing division of manufacturing enterprise system 150 at step 217. Relevant marketing data is collected by a marketing team of manufacturing enterprise system 150 at step 218 and is then delivered to a designated buyer or purchasing division of manufacturing enterprise system 150 where it is reviewed. The microelectronics division (MD) of manufacturing enterprise system 150 manufactures components for internal, as well as external, use. The results of the cost analysis are evaluated along with the results of the cost analyses performed in steps 219-228 via the A-Source tool, allowing manufacturing enterprise system 150 to further optimize its purchasing decisions. Marketing has general knowledge of which components manufactured by manufacturing enterprise system 150 are in demand by customers and how many are needed at any given time. This information allows manufacturing enterprise system 150 to compare pricing, demand and availability of components produced internally to similar components offered by outside sources.

Figure 2B:
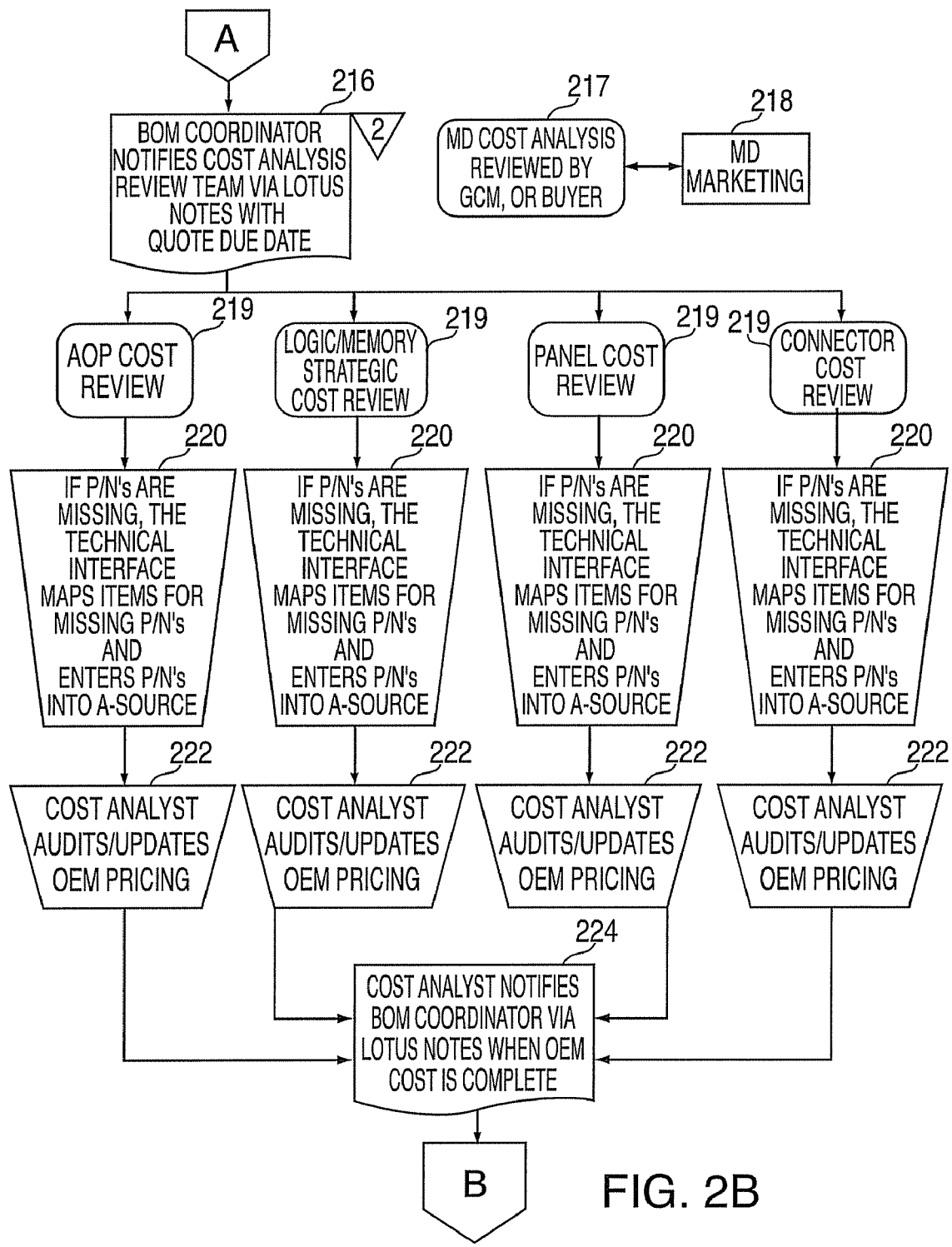
Figure 2C:
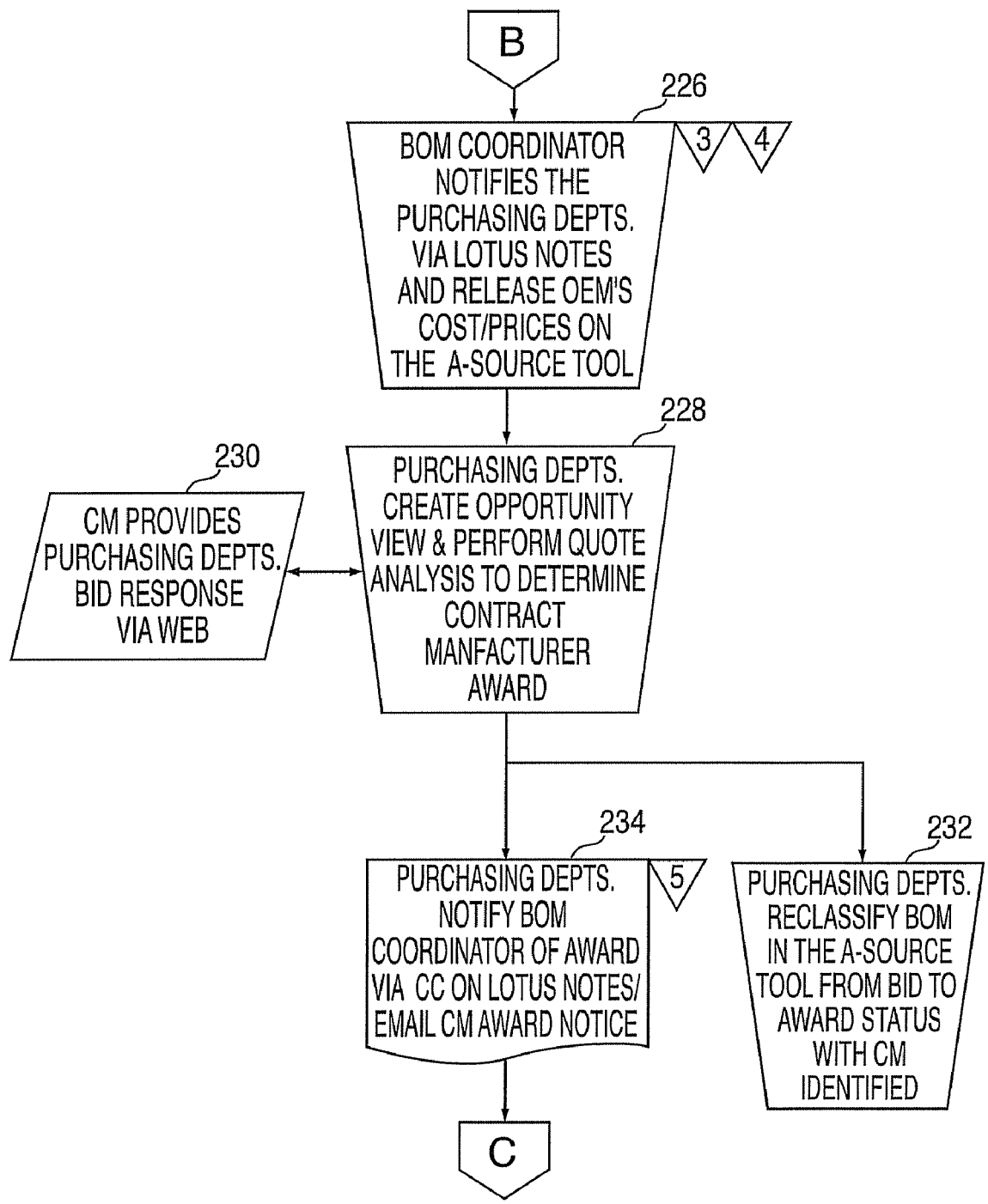

The cost analysis review team is comprised of four financial or accounting departments/divisions and may be defined by manufacturing enterprise 150 via the A-Source tool. Additionally, there may be more than or fewer than four financial departments specified. For purposes of illustration, the four departments illustrated in FIG. 2B are 'Active, Optics, Passives Cost Review Department' (AOP), 'Logic/Memory Strategic Cost Review Department', 'Panel Cost Review Department', and 'Connector Cost Review Department'. These four departments review the information sent by the BOM coordinator at step 219. If part numbers relating to the items listed on the BOM are missing, a technical interface maps items for missing part numbers and enters these numbers into the A-Source tool at step 220. The technical interface process may be implemented by a representative of manufacturing enterprise system 150 utilizing a technical database or technical manual to map the missing part numbers to the respective BOM items. The cost analyst for each department audits the completed information and updates manufacturing enterprise system's 150 'in house' pricing information accordingly at step 222. All parts listed on the processed BOM are now identifiable by their respective part numbers. Further, accurate updated pricing information for each part on the BOM is available. Upon completion, the cost analyst for each department of the cost analysis review team notifies the BOM coordinator at step 224. The BOM coordinator in turn notifies the purchasing departments via Lotus Notes™ and releases the completed cost/pricing information on the A-Source tool at step 226 of FIG. 2C. The date of release is recorded in the A-Source activity log at Flag 3, as well as the date that the BOM coordinator notifies the purchasing departments that the cost analysis is completed at Flag 4. Once the purchasing departments receive a response to the posted BOM bid request on the web site at step 230, they create an 'opportunity view' and perform a 'quote analysis' in order to determine the contract manufacturer award at step 228. The opportunity view and quote analysis provide a standardized layout of the response data from each of the contract manufacturers which allows for easy comparisons to be made by the purchasing departments. These departments then reclassify the BOM in the A-Source tool from 'Bid' status to 'Award' status, identifying the selected contract manufacturer at step 232. The departments notify the BOM coordinator of this award via a "cc" or 'carbon copy' procedure on Lotus Notes™ at step 234. The date that the BOM coordinator is notified of the award is logged into the A-Source activity log at Flag 5. The original e-mail or award notice is sent to the contract manufacturer who has been selected to receive the award.

Figure 2D:
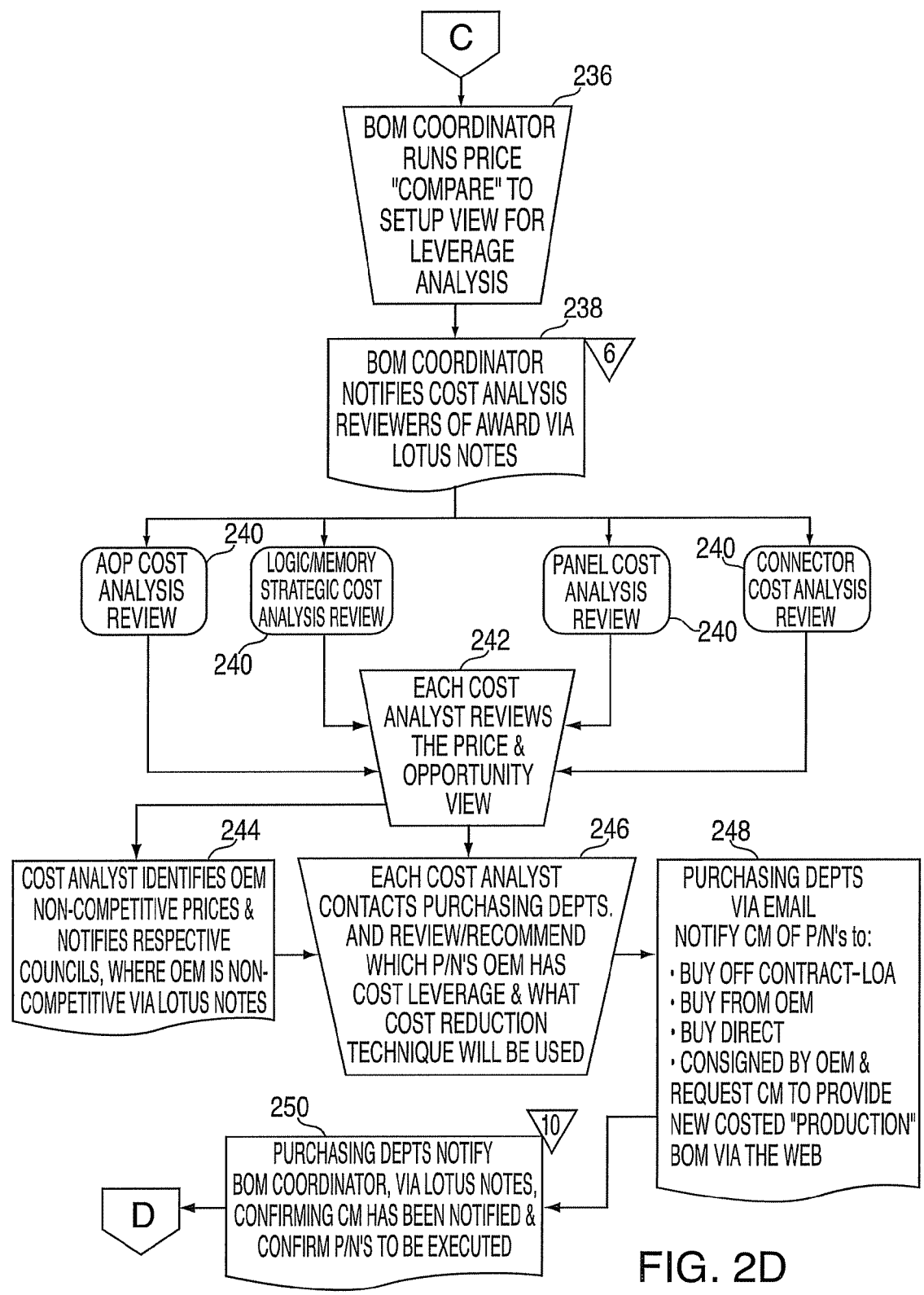

The BOM coordinator runs a price comparison view for leverage analysis at step 236 of FIG. 2D, followed by a notice to the cost analysis review teams of the award via Lotus Notes™ at step 238. The date of this notice is recorded in the A-Source activity log at Flag 6. The price comparison view allows manufacturing enterprise 150 to compare its pricing and availability information relating to each part number on the BOM file to the pricing and availability information supplied by the contract manufacturer of enterprise 180 in its response to the bid/RFQ received. The cost analysis review team performs a cost analysis review of the items in the notice that pertain to each of the departments at step 240. Each cost analyst then reviews the price and opportunity view at step 242. The cost analyst identifies internal non-competitive prices and notifies the respective councils, where manufacturing enterprise system 150 is non-competitive via Lotus Notes™ at step 244. Each cost analyst contacts the respective purchasing departments and reviews and/or recommends which part numbers the organization has cost leverage for and what cost reduction technique will be used at step 246. One such cost reduction technique includes "buying off an OEM contract" which, as described above, enables a contract manufacturer to procure components for selected assemblies from a supplier who is under contract with the OEM at the OEM contracted price. When this cost reduction technique is chosen, the A-Source application automatically generates a letter of authorization request to the supplier at system 160 as illustrated in FIG. 5. The "buy off" process is further described in FIG. 6.

The purchasing departments then notify the contract manufacturer via e-mail or extranet 190 at step 248 specifying those part numbers containing business attributes that are subject to the price protection techniques defined above. For example, the e-mail message might direct the contract manufacturer of supplier enterprise 160 to procure a part that is incorporated into manufacturing enterprise system's 150 direct rebate program. This contract manufacturer would then procure this part from a pre-approved supplier that participates in manufacturing enterprise system's 150 direct rebate plan.

The contract manufacturer pays market price for the part while the difference between the market price and the manufacturing enterprise's contract price is rebated to manufacturing enterprise system 150. These purchasing departments also request that the contract manufacturer provide a new costed 'Production' BOM via the Web. This Production BOM process is further described in FIG. 3. Next, the purchasing departments notify the BOM coordinator via Lotus Notes™, confirming that the contract manufacturer has been notified and confirms the part numbers to be executed at step 250. The date in which the BOM coordinator is notified is recorded in the A-Source activity log at Flag 10.

Figure 2E:
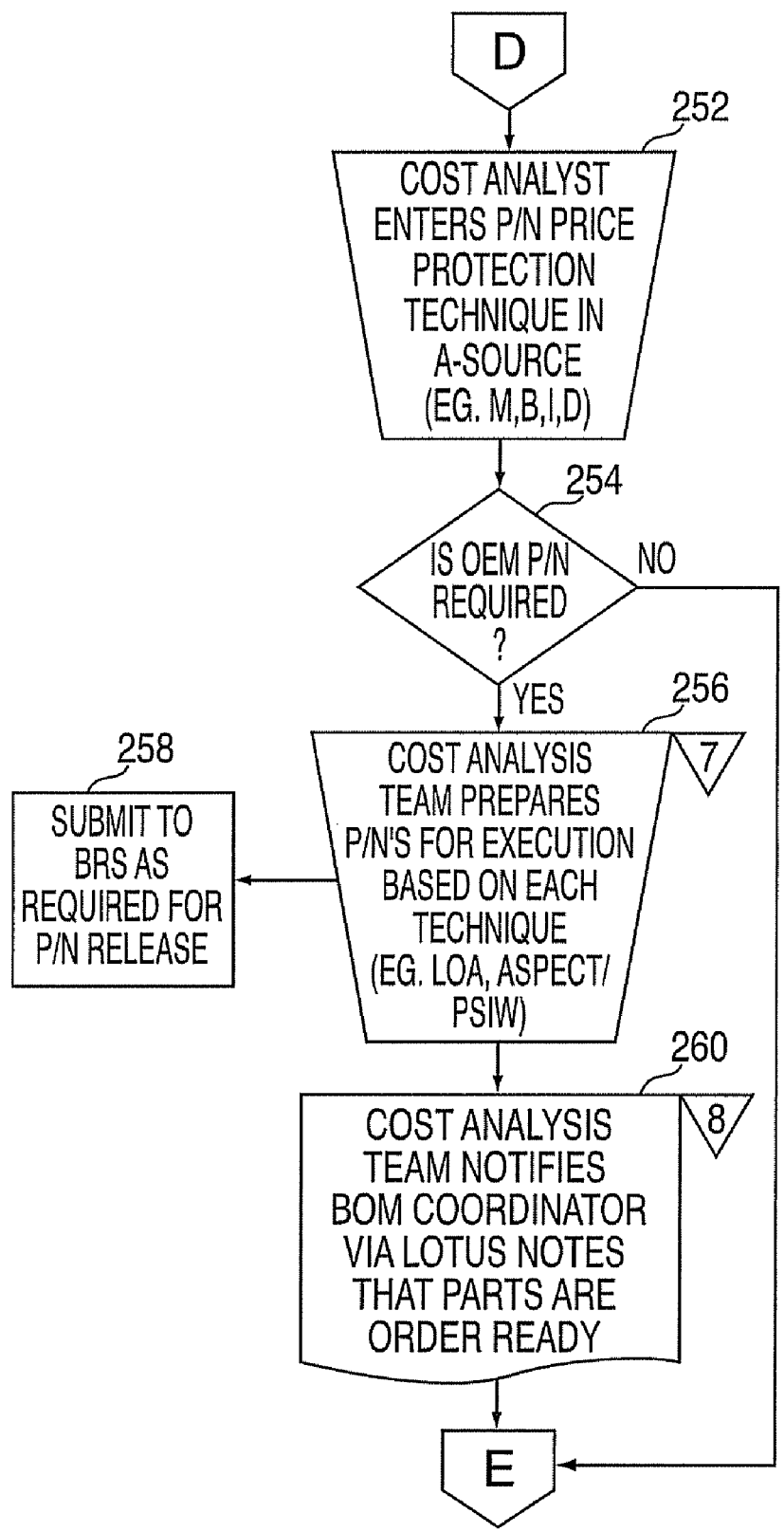

The cost analyst enters a price protection technique for a selected part number in the A-Source tool at step 252 of FIG. 2E. At step 254, the system is queried to see whether an 'in house' part number is required. A part number is required when the OEM is selling the part to a contract manufacturer. The part needs to be identifiable by the specific OEM part number for administrative purposes, i.e., the OEM's system operates on this basis. If the part number is not in the OEM database, the OEM then releases a number. If an 'in house' part number needs to be released, flow proceeds to step 256 where the cost analysis review team prepares part numbers for execution based upon each price protection technique. The date the team begins to prepare part numbers for execution is recorded in the A-Source activity log at Flag 7. This information is passed on to the bill of material review group as required for release of part numbers at step 258.

The cost analysis review team notifies the BOM coordinator via Lotus Notes™ that the part numbers are now 'order ready' at step 260. The date of this notification is recorded in the A-Source activity log at Flag 8.

Figure 2F:
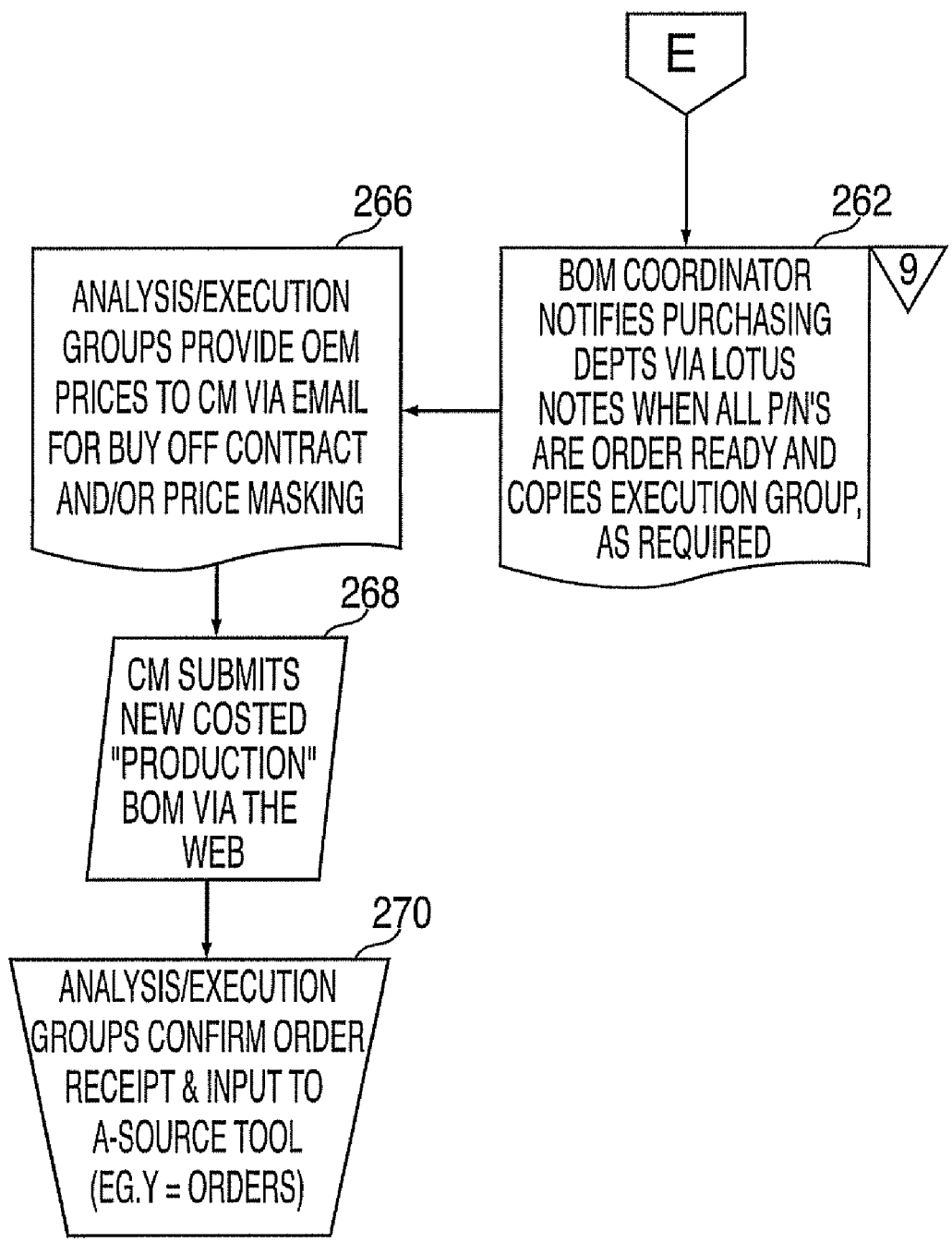

Once the part numbers are 'order ready', or alternatively, if no part number is required, flow proceeds to step 262 of FIG. 2F where the BOM coordinator notifies the purchasing departments via Lotus Notes™ that all part numbers are order ready and copies the execution group as required. The date of this notice is subsequently recorded in the A-Source activity log at Flag 9. The analysis/execution groups provide 'in house' prices to the contract manufacturer via e-mail for items subject to a 'buy off' contract and/or 'price masking' at step 266. In the case of a "buy off" contract, this information may be provided to the contract manufacturer in the form of a letter as illustrated in FIG. 7. The contract manufacturer submits a new costed 'Production' BOM via the Web to the analysis/execution groups at step 268. The analysis/execution groups confirm the order receipt for the contract manufacturer and input the order into the A-Source tool at step 270.

Figure 2G:
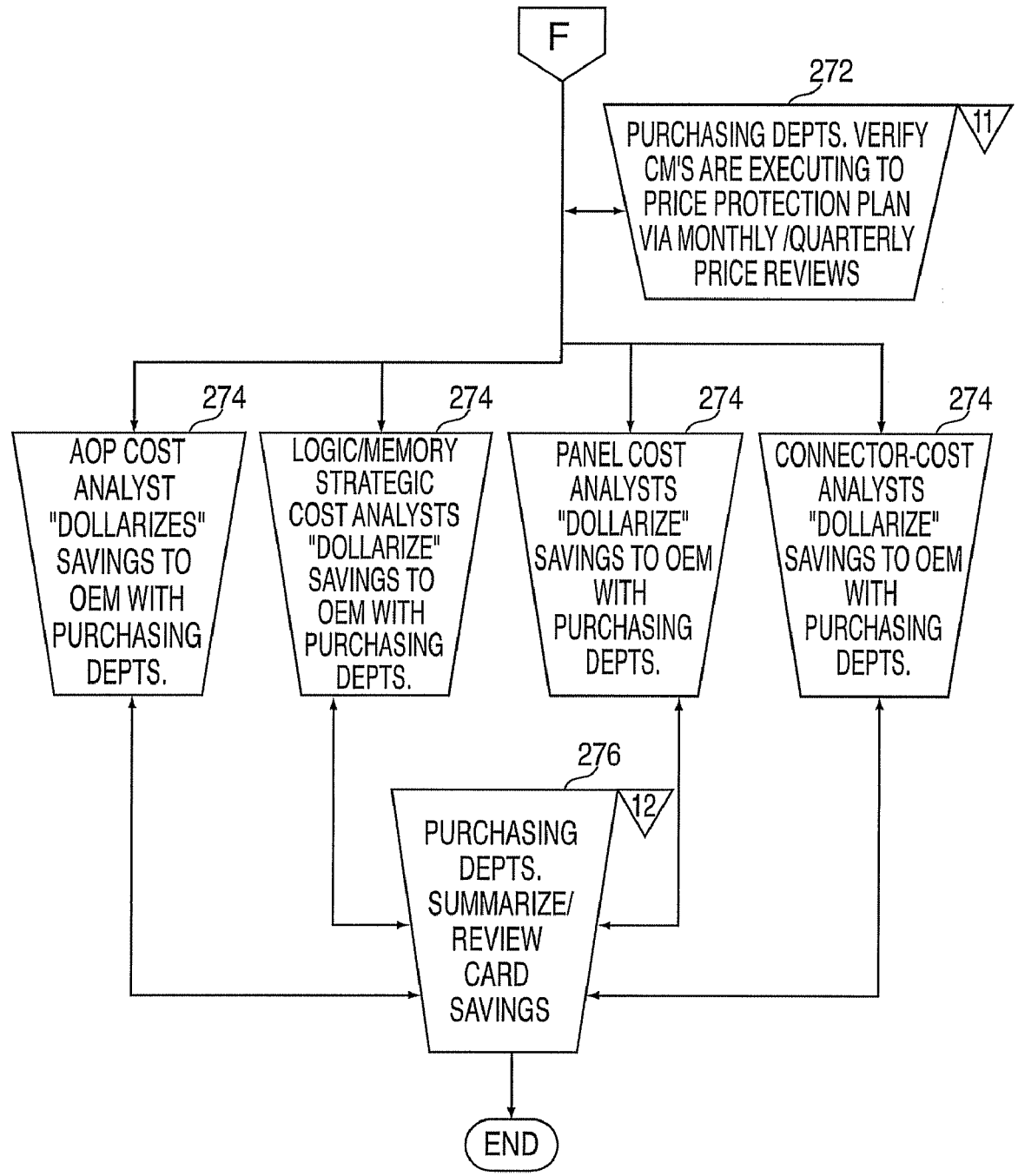

The purchasing departments verify that contract manufacturers are complying with the price protection plan via monthly or quarterly price reviews at step 272 of FIG. 2G. The cost analysis review team "dollarizes" or measures the savings to manufacturing enterprise 150 with the purchasing departments at step 274. These savings are presented to the purchasing departments in the form of a buyer report as illustrated in FIG. 8. These departments summarize/review the savings with the cost analysis review team at step 276.

Figure 3A:
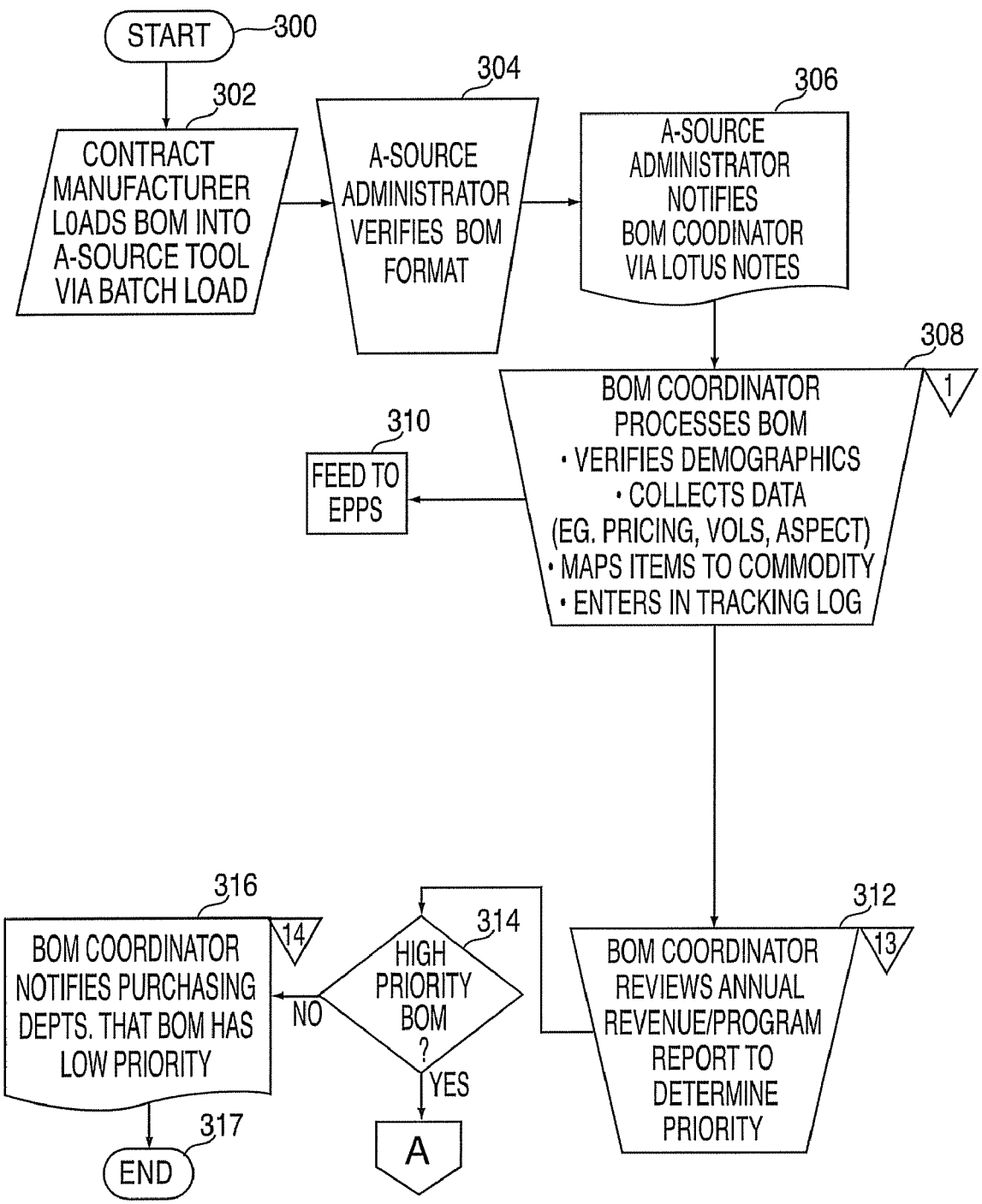
FIGS. 3A-3F represent a flowchart of the A-source production BOM process.
Figure 3B:
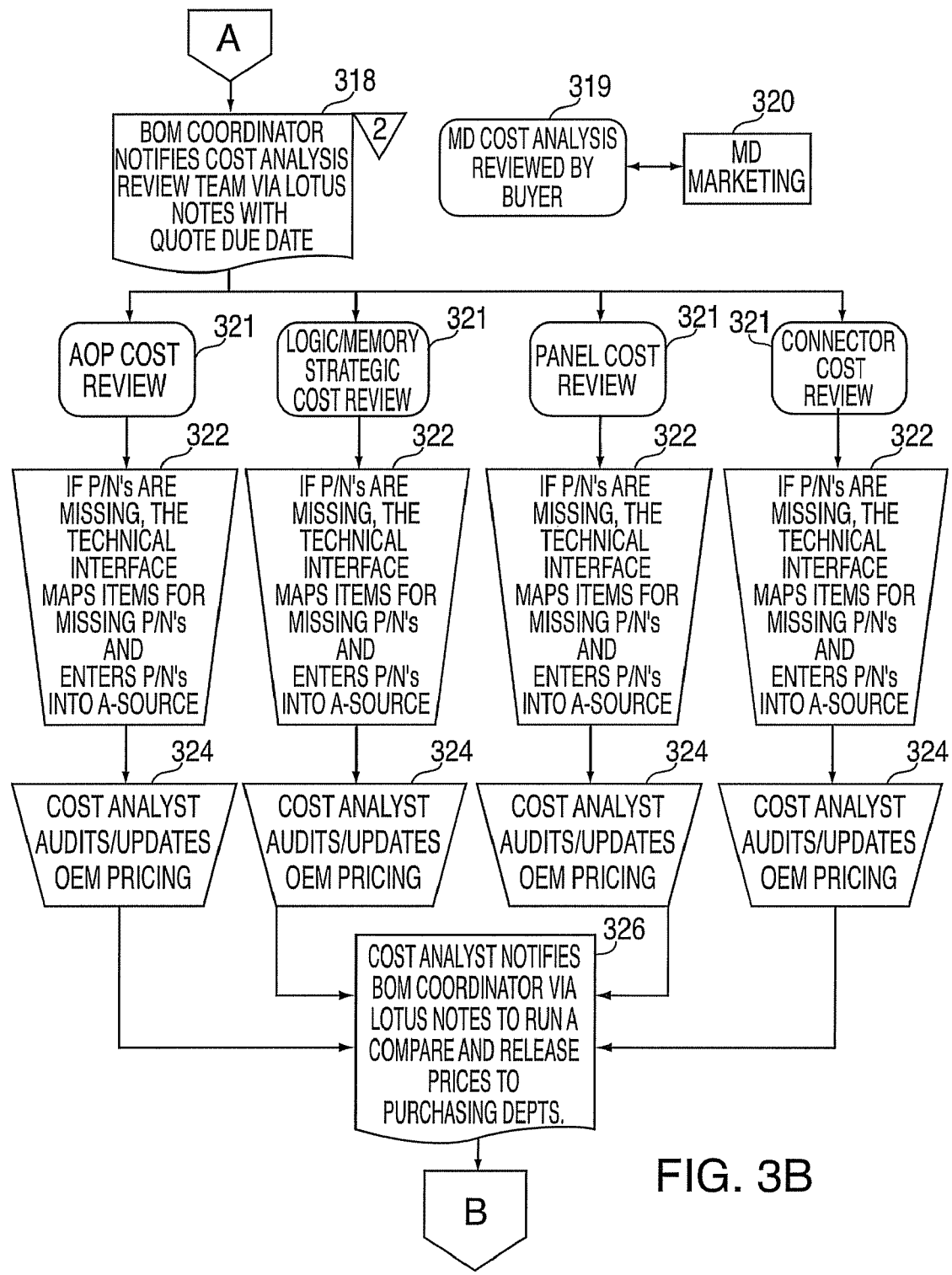
Figure 3C:
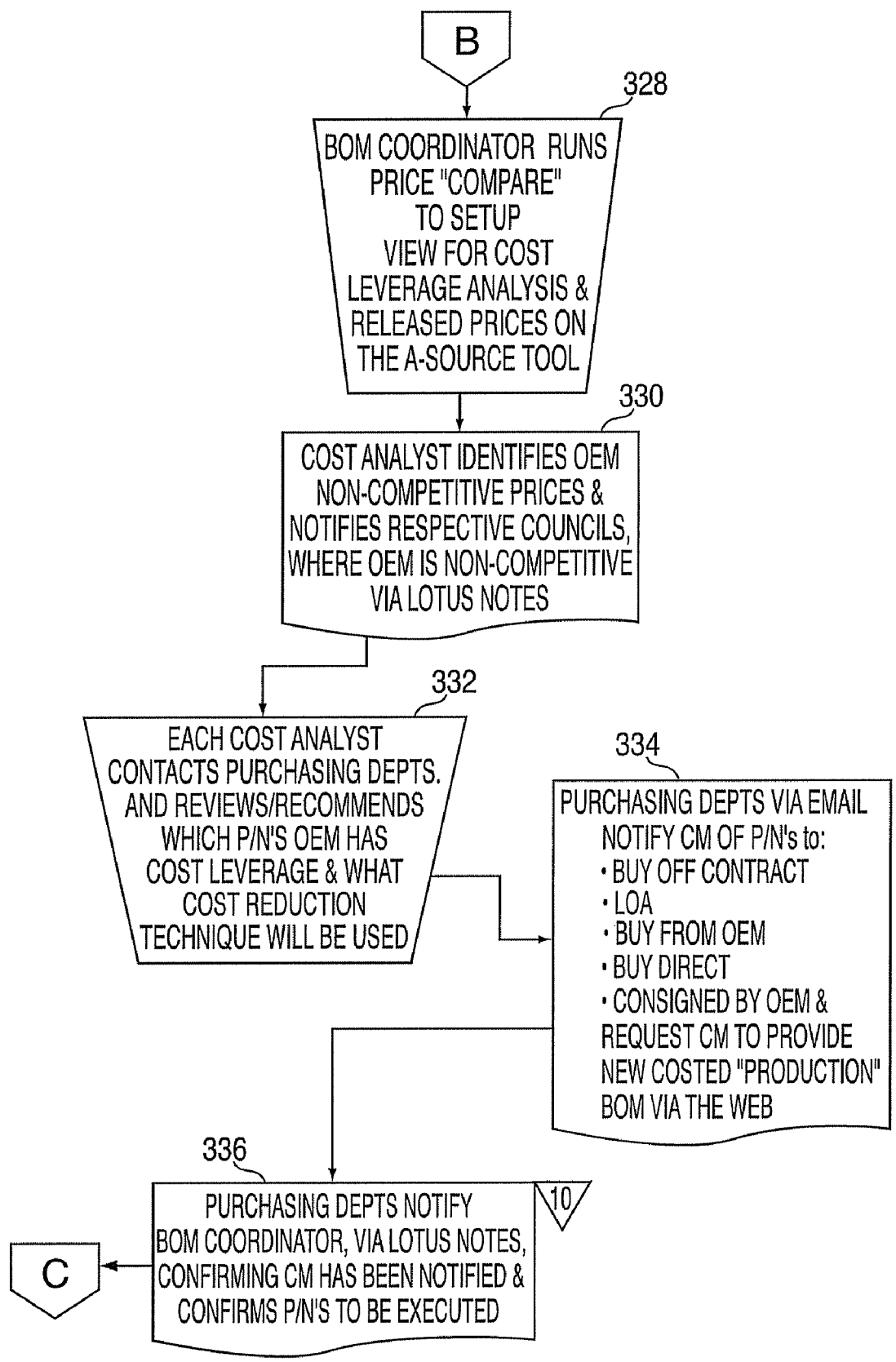

Referring now to FIG. 3A, the Production BOM process for the A-Source tool begins at step 300. A contract manufacturer loads a BOM file into the A-Source tool via batch load procedure from supplier enterprise 160 at step 302. The A-Source administrator of manufacturing enterprise system 150 verifies the BOM format at step 304 and then notifies the BOM coordinator via Lotus Notes™ at step 306. The BOM coordinator processes the BOM file at step 308. This processing includes verifying demographics; collecting data relating to pricing, volumes, and items listed in external data warehouse files; mapping items to commodity; and entering this information in a tracking log stored in data storage device 120. The date that the BOM coordinator receives the BOM is recorded in the A-Source activity log at Flag 1. This information is then fed into the EPPS of manufacturing enterprise 150 at step 310. The BOM coordinator then reviews an annual revenue/program report to determine whether or not the BOM should have a high priority at step 312. The A-Source Production BOM is updated with division, location, and other information relating to the respective purchasing department. At step 314 a determination of priority is calculated. If the priority is not high, flow proceeds to step 316 where the BOM coordinator notifies the respective purchasing departments that the BOM has low priority. The BOM coordinator runs an extended BOM cost report monthly and reviews the information to determine BOM priority. The date of the report is recorded in the A-Source activity log at Flag 14 and the process ends at step 317. If, on the other hand, the priority is calculated to be high, flow proceeds to step 318 of FIG. 3B where the BOM coordinator notifies the cost analysis review team via Lotus Notes™ along with a quote due date. The date that the BOM coordinator releases the cost analysis review information to the cost analysis review team is recorded in the A-Source activity log at Flag 2. A microelectronics cost analysis occurs at steps 319 and 320 and is similar to that described in FIG. 2; therefore, it will not be explained in further detail.

At step 320, the cost analysis review team performs a cost review analysis of the BOM information. At step 322, a technical interface maps items for missing part numbers and enters them into the A-Source tool. The cost analysis review team audits and updates the OEM pricing information at step 324 and then notifies the BOM coordinator via Lotus Notes™ to run a comparison and price release report to the purchasing departments at step 326. Accordingly, the BOM coordinator runs a price comparison view for cost leverage analysis and released prices on the A-Source tool at step 328 of FIG. 3C.

The cost analyst identifies OEM non-competitive prices and notifies respective commodity councils where the OEM is non-competitive via Lotus Notes™ at step 330. Each cost analyst contacts the purchasing departments and reviews and/or recommends which part numbers the OEM has cost leverage for and what cost reduction technique will be used at step 332. One such cost reduction technique includes "buying off an OEM contract" which, as described above, enables a contract manufacturer to procure components for selected assemblies from a supplier who is under contract with the OEM at the OEM contracted price. When this cost reduction technique is chosen, the A-Source application automatically generates a letter of authorization request to the supplier at system 160 as illustrated in FIG. 5. The purchasing departments notify the contract manufacturer via e-mail or extranet 190 specifying the part numbers with business attributes subject to the price protection techniques defined earlier, and requests that the contract manufacturer provide a new costed 'Production' BOM via the Web at step 334. These departments then notify the BOM coordinator, via Lotus Notes™, confirming that the contract manufacturer has been notified and confirms those part numbers to be executed at step 336. The date these departments notify the BOM coordinator is recorded in the A-Source activity log at Flag 10.

Figure 3D:
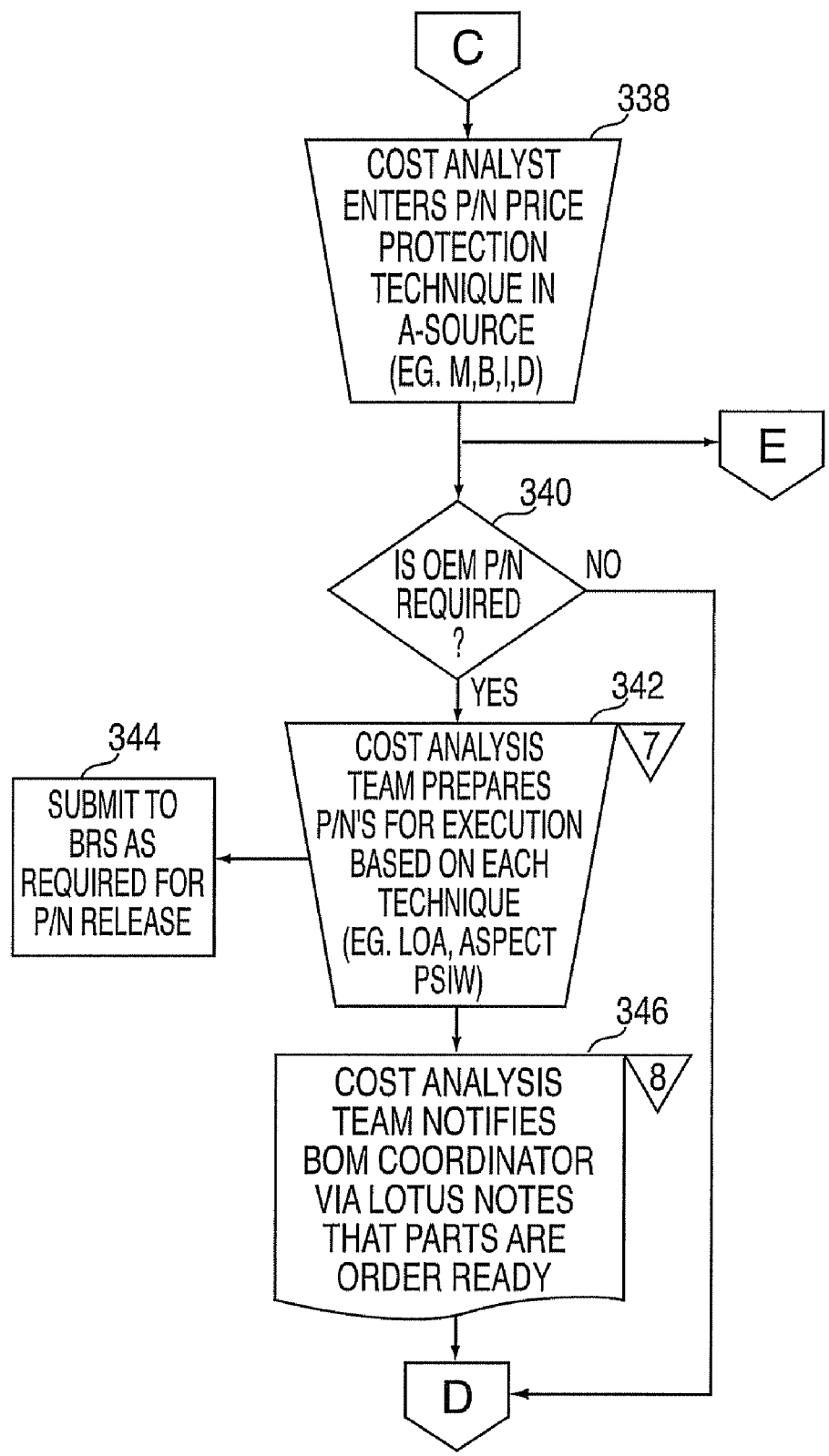
Figure 3E:
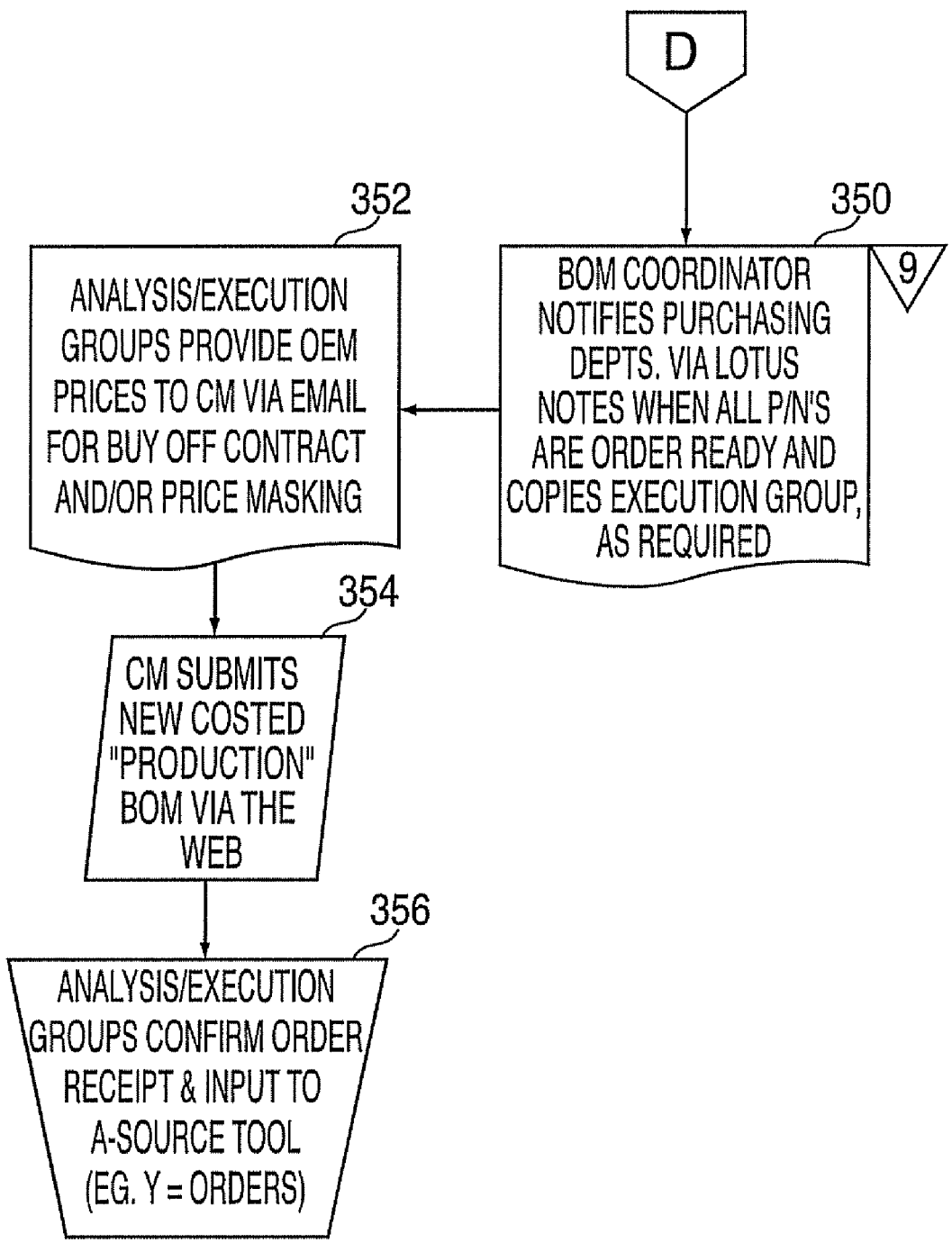

The cost analyst then enters the part number price protection technique in the A-Source tool at step 338 of FIG. 3D. At step 340, the A-Source tool checks to see if an OEM or 'in house' part number is required. If so, flow proceeds to step 342 where the cost analysis review team prepares part numbers for execution based on each technique. The date the cost analysis review team begins to prepare part numbers for execution for each technique is recorded in the A-Source activity log at Flag 7. This information is submitted to the bill of material review group as required for part number release at step 344. The cost analysis review team notifies the BOM coordinator via Lotus Notes™ that part numbers are 'order ready' at step 346. The date the cost analysis review team notifies the BOM coordinator that the part numbers are order ready is recorded in the A-Source activity log at Flag 8. At step 350 of FIG. 3E, the BOM coordinator notifies the purchasing departments via Lotus Notes™ when all part numbers are order ready and copies the execution group as required. This date is recorded in the A-Source activity log at Flag 9. At step 352, the analysis/execution groups provide OEM prices to the contract manufacturer via e-mail for a 'buy off' contract and/or 'price masking'. In the case of a "buy off" contract, this information may be provided to the contract manufacturer in the form of a letter as illustrated in FIG. 7. The contract manufacturer submits the new costed Production BOM via the Web at step 354. The analysis/execution groups confirm order receipt and input to the A-Source tool at step 356. For example, the input might be a 'Y' in the "Orders" field.

Figure 3F:
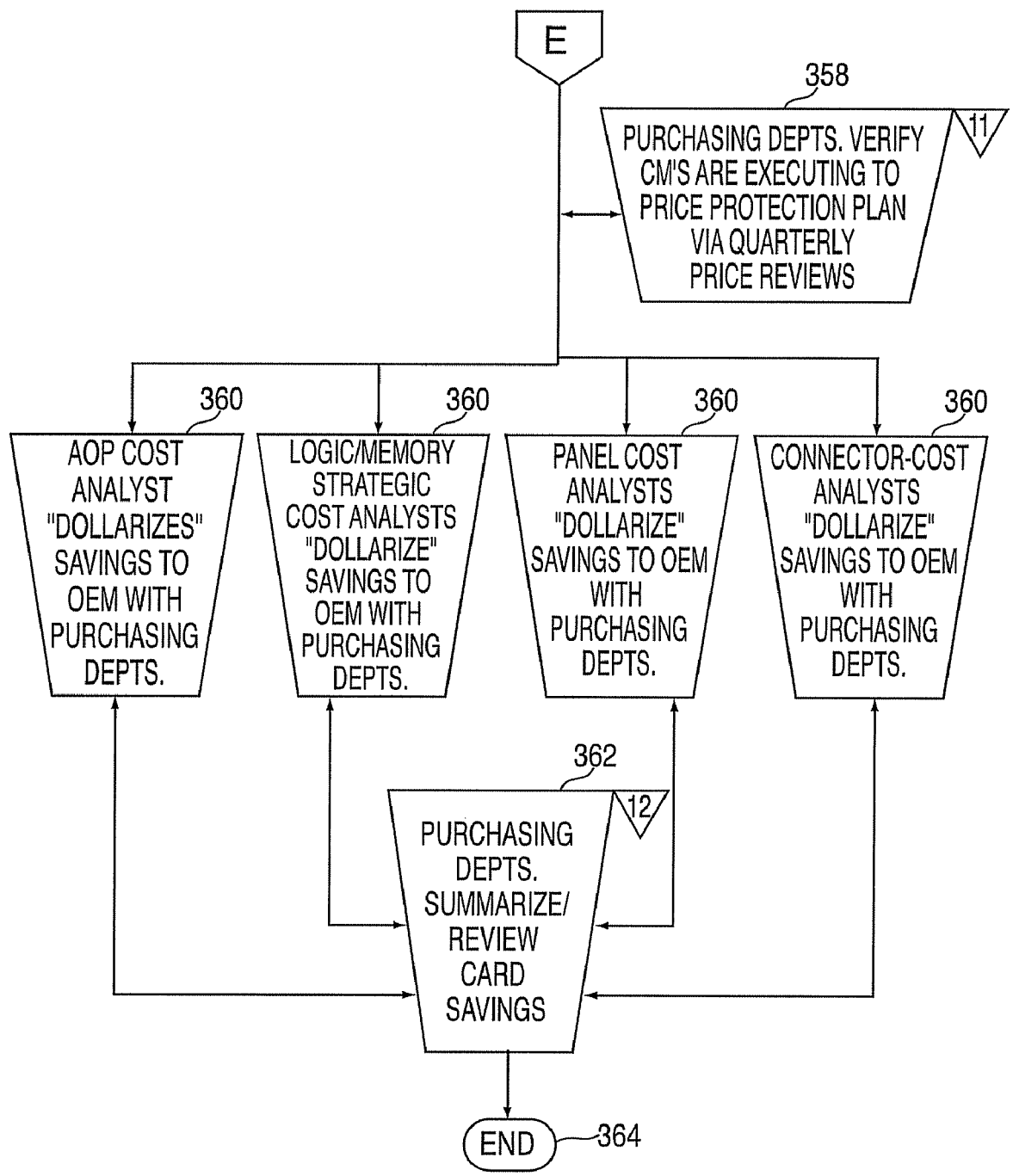

The purchasing departments periodically verify that the contract manufacturer is executing according to the price protection plan technique via quarterly price reviews at step 358 of FIG. 3F. Each of the cost analyst review team members "dollarize" the savings to the OEM with the purchasing departments at step 360. These savings are presented to the purchasing departments in the form of a buyer report as illustrated in FIG. 8. At step 362, the purchasing departments summarize/review the savings and the process ends at step 364.

Figure 4:
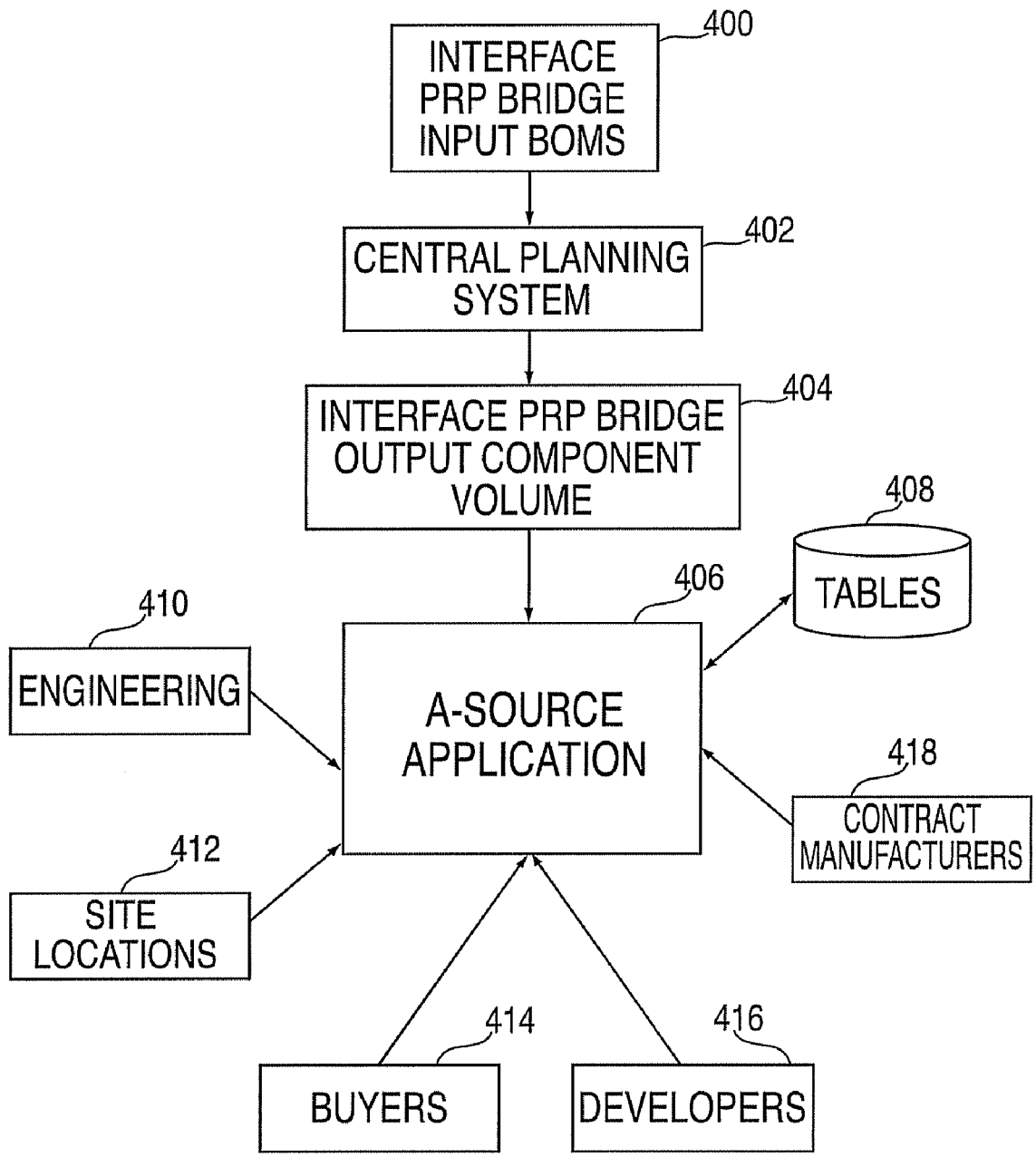
FIG. 4 is a block diagram illustrating the operational aspects of the A-source application and bridging tool.

Referring now to FIG. 4, the operational aspects of the A-source application and bridging component is illustrated. An input bridge 400 receives BOM data and transmits it to a central planning system 402, which executes a suite of applications provided by the manufacturing enterprise 150. The output bridge 404 is an interface between central planning system 402 and the A-Source application 406. It receives data from central planning system 402 and converts the data into a format that can be understood by the A-Source tool 406. The A-Source tool 406 develops tables representing key information and organizes the information according to the needs of manufacturing enterprise system 150. These tables are stored in database 408. The A-Source tool 406 receives inputs from a variety of sources, such as engineering 410, site locations 412, buyers 414, developers 416, and contract manufacturers 418.

The bridging tool allows BOM configuration data (or physical attributes) stored in one or more databases to be combined with BOM business attributes stored in a separate database or databases. Examples of business attributes include: whether the part can be purchased by direct rebate, whether the part is price-masked, and whether an existing contract specifies how the part is to be procured. The configuration data, together with the business attributes data, allow manufacturing enterprise system 150 to create a consolidated demand statement including forecasting information. The A-Source tool generates this consolidated demand statement and transmits it to supplier enterprise system 160 for action.

Figure 6:
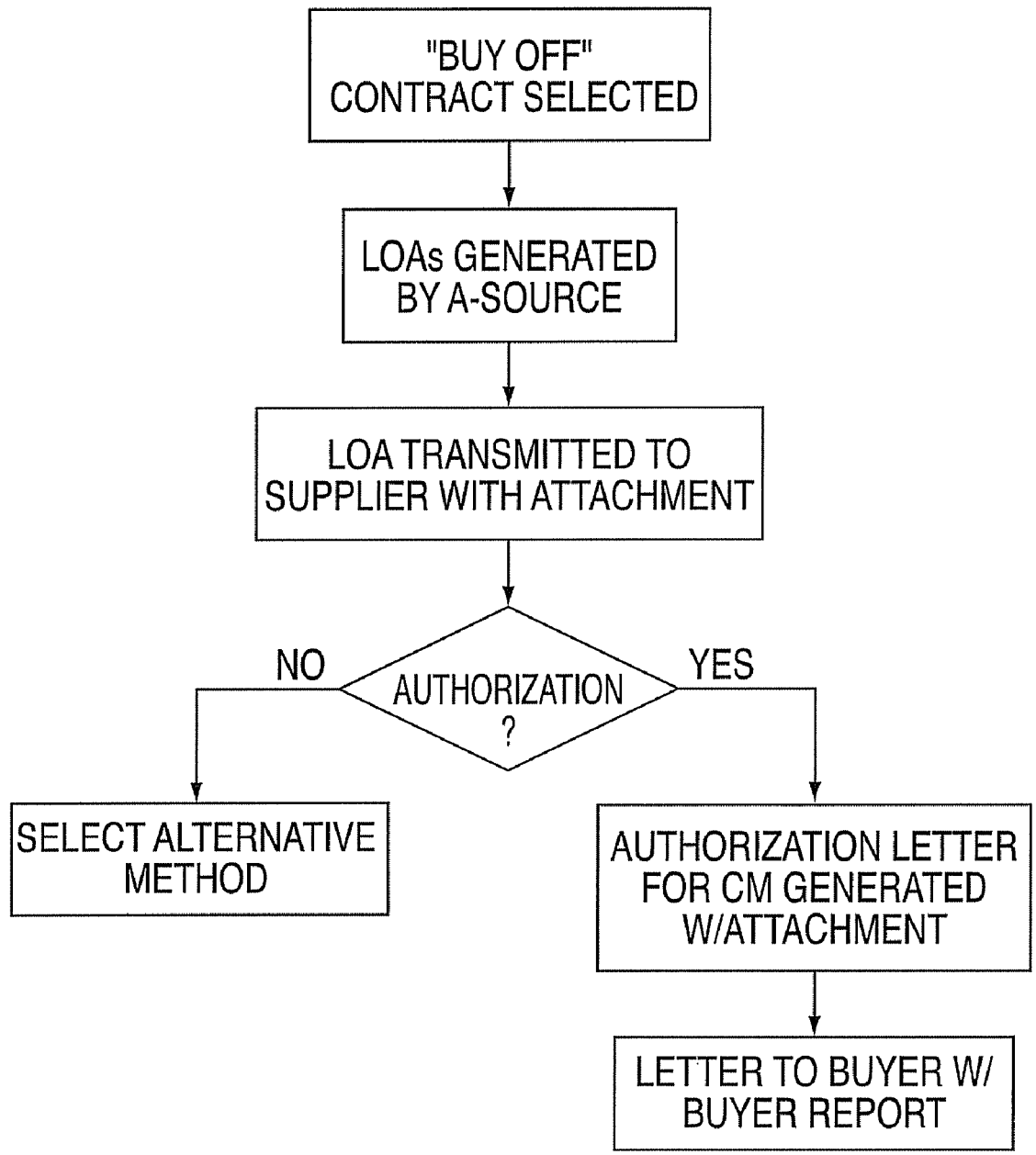
FIG. 6 is a flowchart describing the letter of authorization process implemented by the A-Source application.

As described above, one of the cost reduction techniques utilized by the OEM is the "buy off" contract. When this technique is selected, the A-source application generates and transmits requests, reports, letters and other documents in assistance of this method. FIG. 6 illustrates the "buy off" contract process. A cost analyst selects the "buy off" contract cost reduction technique as the preferred method at step 602. The A-source application generates a request for authorization letter to a designated supplier at system 160 who is under contract with the OEM to sell components with part numbers identical to those required for the BOM at issue at step 604. A sample request for authorization letter is shown in FIG. 5. Authorization letter 500 requests that supplier enterprise 160 provide written authorization for contract manufacturer enterprise 180 to buy selected components directly from supplier 160 at the contract price specified in the OEM's contract. Attached to the authorization is a schedule (not shown) which itemizes specific part numbers subject to authorization and includes descriptions, component volumes, and the special contract price per unit. Authorization request letter 500 and its attachment may be transmitted by email or via extranet 190 to supplier system 160 at step 606.

Supplier 160 may respond by either sending an 'authorization' or 'non-authorization' notice to enterprise 150 at step 608, either agreeing or disagreeing to the request. This response can also be sent over the Internet via e-mail or via extranet 190 to enterprise 150. If the authorization is approved, the A-source application then automatically generates a letter to the contract manufacturer at enterprise 180 at step 610, authorizing the manufacturer to purchase designated parts directly from the supplier at enterprise 160. The letter shown in FIG. 7 details the guidelines that the contract manufacturer must follow. For example, the contract manufacturer is required to keep pricing information confidential for a period of time, that the authorization only applies to part numbers provided with the letter, and that copies of purchase orders between the contract manufacturer and the supplier will be sent to enterprise 150 for tracking and reconciliation purposes.

The A-source application subsequently generates a buyer report identifying the actual and projected cost savings for a specified department or division at step 612. A sample buyer report is shown at FIG. 7. If authorization is not granted by supplier system 160, the OEM may select an alternative cost savings technique to be utilized or may forego any cost savings technique for this BOM item if desired at step 614. The A-Source application standardizes and simplifies the process of exchanging component pricing information with contract manufacturers, enabling the manufacturing enterprise to quickly evaluate bids, ensure that their suppliers are paying the lowest possible prices for parts, and make accurate, cost-effective buying decisions. This process enhances productivity, provides reduced time-to-market for final items, and lower costs of final products as the contract manufacturers pass along their price savings to the manufacturing enterprise.

The A-Source application is executed via workgroup software, such as Lotus Domino™ and Lotus Notes™. The information received by the A-Source application must be able to be combined with data provided by other applications running on manufacturing enterprise system 150. Oftentimes the database applications and the groupware applications are incompatible. It is helpful if these types of information be integrated in order to achieve the benefits provided by the A-Source tool. Accordingly, a bridging component is contained within the A-Source tool which provides this integration.

The A-source application provides a useful means for OEMs to consolidate and analyze a variety of data such as bills of material, requests for quotes (RFQs), requests for price updates, and the physical and business attributes belonging to the bills of material and identify unique cost savings opportunities. The functionality of the A-source application allows an OEM to execute these savings opportunities via the Internet and/or extranet connections with its supply chain partners in real time allowing for greater efficiencies to be realized throughout the production process.

Having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A storage medium encoded with machine-readable computer program code for managing a supply chain within a multi-enterprise environment via a computer network, the multi-enterprise environment including a manufacturing enterprise and at least one supply chain entity, the storage medium including instructions for causing a computer to implement a method, comprising:

loading a bill of material file into the computer network;

processing the bill of material file;

generating a bid request from the bill of material file;

transmitting the bid request to a web site;

receiving a plurality of bid responses from a plurality of supply chain entities;

analyzing the plurality of bid responses;

generating an award notice;

transmitting the award notice to at least one of the plurality of supply chain entities, based upon results of the analyzing;

identifying purchase prices of components that are incurred by the at least one supply chain entity that manufactures products using the components, the products subject to purchase by the manufacturing enterprise under an agreement with the at least one supply chain entity;

comparing the purchase prices incurred by the at least one supply chain entity with purchase prices available to the manufacturing enterprise for the same components from a component supplier;

for components in which the at least one supply chain entity incurs a purchase price greater than the purchase price available to the manufacturing enterprise, generating and transmitting to the component supplier a request to authorize the at least one supply chain entity to purchase a quantity of the component from the component supplier at the purchase price available to the manufacturing enterprise;

in response to an affirmative response by the component supplier, generating and transmitting an authorization to the at least one supply chain entity, the authorization authorizing the at least one supply chain entity to purchase the component directly from the component supplier; and tracking selected activities in a log;

wherein the supply chain entity is a contract manufacturer, and the authorization includes an attachment comprising:

guidelines for the contract manufacturer to follow, comprising:

keeping pricing information confidential for a period of time;

the authorization is restricted to part numbers provided with the authorization;

providing copies of purchase orders between the contract manufacturer and the component supplier to the manufacturing entity for tracking and reconciliation purposes; and a request to provide a production bill of materials that factors in revisions to the purchase prices of components that reflect the purchase price available to the manufacturing entity; and wherein the contract manufacturer agrees to abide by the guidelines, comprising:

keeping the pricing information confidential for a period of time;

restricting purchases to the part numbers provided with the authorization;

providing copies of the purchase orders between the contract manufacturer and the component supplier to the manufacturing entity for tracking and reconciliation purposes; and complying with a request to provide the production bill of materials that factors in revisions to the purchase prices of components that reflect the purchase price available to the manufacturing entity.

2. The storage medium of claim 1, wherein the processing the bill of material file includes mapping items contained in the bill of material file from the manufacturing enterprise with items provided by external sources via the network.

3. The storage medium of claim 2, wherein the items contained in the bill of material file include:
at least one component number;
at least one component name;
at least one component description;
at least one component price; and
at least one component availability.

4. The storage medium of claim 2, wherein the items provided by the external sources include:
at least one component number;
at least one component name;
at least one component description;
at least one component price; and
at least one component availability.

5. The storage medium of claim 2, wherein the external sources include:
a database of the manufacturing enterprise;
a data warehouse; and
a technical manual.

6. The storage medium of claim 1, wherein the processing the bill of material file includes automatically transmitting notifications to an administrative entity of the manufacturing enterprise via the network.

7. The storage medium of claim 1, wherein the network is an extranet.

8. The storage medium of claim 1, wherein the analyzing the bid response includes comparing data contained in the bill of material file with data contained in the bid response.

9. The storage medium of claim 2, wherein the mapping includes mapping component information to at least one commodity.

10. The storage medium of claim 1, wherein the request comprises:
part numbers subject to authorization;
descriptions of the part numbers;
component volumes; and
contract price per unit.

11. The storage medium of claim 1, wherein the affirmative response by the component supplier includes a notification indicating approval of the request.

12. A storage medium encoded with machine-readable computer program code for managing a supply chain within a multi-enterprise environment via a computer network, the multi-enterprise environment including a manufacturing enterprise and at least one supply chain entity, the storage medium including instructions for causing a computer to implement a method, comprising:

loading a bill of material file into the computer network;
processing the bill of material file;
generating a bid request from the bill of material file;
transmitting the bid request to a web site;
receiving a plurality of bid responses from a plurality of supply chain entities;
analyzing the plurality of bid responses;
generating an award notice;
transmitting the award notice to at least one of the plurality of supply chain entities, based upon results of the analyzing;

identifying purchase prices of components that are incurred by the at least one supply chain entity that manufactures products using the components, the products subject to purchase by the manufacturing enterprise under an agreement with the at least one supply chain entity;

comparing the purchase prices incurred by the at least one supply chain entity with purchase prices available to the manufacturing enterprise for the same components from a component supplier;

for components in which the at least one supply chain entity incurs a purchase price greater than the purchase price available to the manufacturing enterprise, generating and transmitting to the component supplier a request to authorize the at least one supply chain entity to purchase a quantity of the component from the component supplier at the purchase price available to the manufacturing enterprise;

in response to an affirmative response by the component supplier, generating and transmitting an authorization to the at least one supply chain entity, the authorization authorizing the at least one supply chain entity to purchase the component directly from the component supplier; and tracking selected activities in a log;

wherein the processing the bill of material file includes associating physical attributes of components listed on the bill of material file with corresponding business attributes of the components; and wherein further the processing the bill of material file includes mapping items contained in the bill of material file from the manufacturing enterprise with items provided by external sources via the network;

wherein the supply chain entity is a contract manufacturer, and the authorization includes an attachment comprising:

guidelines for the contract manufacturer to follow, comprising:

keeping pricing information confidential for a period of time;

the authorization is restricted to part numbers provided with the authorization;

providing copies of purchase orders between the contract manufacturer and the component supplier to the manufacturing entity for tracking and reconciliation purposes; and a request to provide a production bill of materials that factors in revisions to the purchase prices of components that reflect the purchase price available to the manufacturing entity;

wherein the contract manufacturer agrees to abide by the guidelines, comprising:

keeping the pricing information confidential for a period of time;

restricting purchases to the part numbers provided with the authorization;

providing copies of the purchase orders between the contract manufacturer and the component supplier to the manufacturing entity for tracking and reconciliation purposes; and complying with a request to provide the production bill of materials that factors in revisions to the purchase prices of components that reflect the purchase price available to the manufacturing entity.

13. The storage medium of claim 12, wherein the items contained in the bill of material file include:
   at least one component number;
   at least one component name;
   at least one component description;
   at least one component price; and
   at least one component availability.

14. The storage medium of claim 12, wherein the items provided by the external sources include:
   at least one component number;
   at least one component name;
   at least one component description;
   at least one component price; and
   at least one component availability.

15. The storage medium of claim 12, wherein the external sources include:
   a database of the manufacturing enterprise;
   a data warehouse; and
   a technical manual.

16. The storage medium of claim 12, wherein the processing the bill of material file includes automatically transmitting notifications to an administrative entity of the manufacturing enterprise via the network.

17. The storage medium of claim 12, wherein the analyzing the bid response includes comparing data contained in the bill of material file with data contained in the bid response.

18. The storage medium of claim 12, wherein the business attributes include a price masked component.

19. The storage medium of claim 12, wherein the business attributes include a consignment component.

20. The storage medium of claim 12, wherein the business attributes include a buy off contract.

21. The storage medium of claim 12, wherein the business attributes include a direct rebate plan.

* * * * *